United States Patent
Sakata et al.

(10) Patent No.: US 7,983,403 B2
(45) Date of Patent: Jul. 19, 2011

(54) COMMUNICATION APPARATUS FOR PROVIDING PRESENCE INFORMATION

(75) Inventors: Yoshifumi Sakata, Fukuoka (JP); Makoto Matsuoka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1336 days.

(21) Appl. No.: 11/533,856

(22) Filed: Sep. 21, 2006

(65) Prior Publication Data
US 2007/0121528 A1    May 31, 2007

(30) Foreign Application Priority Data

Sep. 22, 2005  (JP) ............................ P. 2005-275743
Sep. 13, 2006  (JP) ............................ P. 2006-247728

(51) Int. Cl.
H04M 1/56   (2006.01)
H04M 15/06  (2006.01)
H04M 3/42   (2006.01)

(52) U.S. Cl. ............ 379/142.01; 379/201.1; 379/201.06

(58) Field of Classification Search ............ 379/142.01, 379/142.15, 201.06, 201.07, 201.08, 201.1, 379/88.17
See application file for complete search history.

(56) References Cited

U.S. PATENT DOCUMENTS

| 6,430,289 | B1 * | 8/2002 | Liffick | 370/352 |
| 2004/0170263 | A1 * | 9/2004 | Michael et al. | 379/201.1 |
| 2004/0201668 | A1 | 10/2004 | Matsubara et al. | |
| 2004/0247089 | A1 * | 12/2004 | Vishik et al. | 379/88.01 |
| 2005/0005008 | A1 * | 1/2005 | Glasser et al. | 709/224 |

FOREIGN PATENT DOCUMENTS

| JP | 2004-072485 | 3/2004 |
| JP | 2004-318822 | 11/2004 |

OTHER PUBLICATIONS

Pocket Studio "Chapter 11, ICQ Setting Preferences" [online], URL:http://pockets.otto.to/~pockets/icq/98a/guide/chap11/b-status.html, Aug. 30, 2005.

* cited by examiner

*Primary Examiner* — Quoc D Tran
(74) *Attorney, Agent, or Firm* — Greenblum & Bernstein, P.L.C.

(57) ABSTRACT

A communication apparatus according to the present invention includes a presence information setting unit that sets presence information including a user display name and its apparatus state, and a presence information notification unit that that notifies an opposing apparatus of the presence information. The communication apparatus further include an action information acquisition unit that detects an opposing user action of the opposing apparatus. The communication apparatus determines that the user is "Away" or "Not Available" when the action information detector detects no user reaction after a predetermined time has passed since the opposing apparatus user's action was detected.

10 Claims, 22 Drawing Sheets

Fig.14(a)

```
NOTIFY sip:121212@192.168.0.10 SIP/2.0
Via:SIP/2.0/TCP 10.1.1.1;branch=z9hG4bK123
To:sip:121212@example.com;tag=789
From:sip:b@10.1.1.1;tag=456
Call-ID:123@10.1.1.1
CSeq:1 NOTIFY
Max-Forwards:70
Contact:sip:b@10.1.1.1
Event:presence;id=1
Subscription-State: active;expires=599
```
(SIP header)

```
<?xml version="1.0"enoodig="UTF-8"?>
<presenes xmlns="urn:ietf:params:xml:ns:pidf"
 xmlns:custom="http://www.w3.org/custom"
 entity="pres:121212@example.com"
  <tuple id="someone1">
   <status>
    <basic>open</basic>
    <custum:activity>Away</custom:activity>
   </status>
   <custom:nickname>Taro< /custom:nickname>
   <timestamp>2005-05-30T16:09:44+05:00</timestamp>
   <contact priority="1.0">mailto:someone@example.com</contact>
  </tuple>
</presence>
```
(Body)

Fig.14(b)

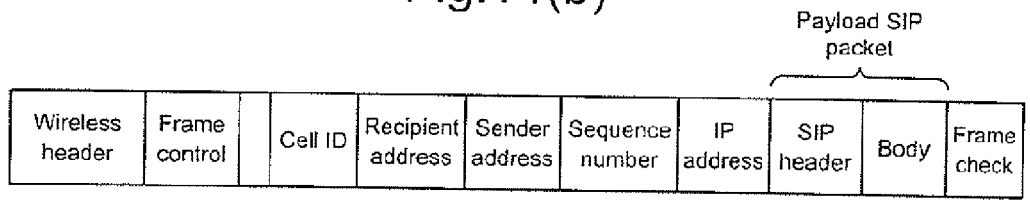

COMMUNICATION APPARATUS FOR PROVIDING PRESENCE INFORMATION

BACKGROUND OF THE INVENTION

1. Field of the Invention

The present invention relates to a communication apparatus that is capable of accurately determining presence information, e.g., "Temporarily Unavailable" or "Not Available" to indicate that an apparatus user is absent.

2. Description of Related Art

Conventionally, an IP network that performs communication through TCP/UDP, IP, such as the Internet or an intranet, has provided various services including streaming, e-mail, and Bulletin board systems, by displaying hypertexts. However, these services are provided through systems whereby a server provides stored data in response to a request made by a client. In this regard, these services lack interactivity. As a real-time system, various services including chatting, VoIP (Voice over Internet Protocol) and teleconference have been provided. However, these services can only be used online (i.e., while being connected to a network), and thus cannot be considered perfectly real-time bidirectional communication, since access is made without confirming the state of a user using an opposing apparatus (hereafter referred to as second apparatus user), with its success left to chance.

Accordingly, a future IP network is expected to achieve more advanced interactive communication that allows the user to acknowledge a real time state of a second apparatus user. To achieve the advanced interactive communication, however, it is necessary for each apparatus user to keep complete track of the state of an opposing apparatus (hereafter referred to as second apparatus), i.e., presence information. Such presence information is defined by RFC3856, RFC2778, and particularly RFC2778, which are issued by IETF (Internet Engineering Task Force) and is currently used for some apparatuses.

First, such presence information is described. Representative presence information, which is notified to apparatuses currently capable of using this service, includes four types: "Online", "Offline", "Away" and "Not Available". For instance, when the connecting state of the second apparatus is changed from "Offline" to "Online", a presence agent (hereinafter referred to as a "PA") section of the second apparatus automatically sends such a notification message; a watcher (subscriber) of an apparatus (first apparatus) used by the self user (hereafter referred to as first apparatus user) receives this message, and retrieves presence information indicating such a state change. At the same time, the watcher stores the information that the user is "Online" in a non-self-presence information section, and displays the information on the apparatus display. In the present specification, a system in which the above-described presence information is notified and exchanged is referred to as a presence system. Further, in the present invention, "Temporarily away from desk" basically means "Away"; and "Away from desk" basically means "Not Available". In other words, "Away from desk" and "Temporarily away from desk" not only refer to a state where the user is absent such as being away from the desk, but also refer to a state where the user cannot perform any operation since the user is driving, for example.

A conventional presence system only notifies representative presence information such as "Online", "Offline", "Away" and "Not Available". Among these states, "Online" and "Offline" literally mean that the user is online (connected) or offline (disconnected), with no confusing meaning. As such a convention presence system, Related Art 1 is disclosed. In contrast, "Away" and "Not Available" need users to determine a meaning of the messages. "Away" indicates a state where the user is online, namely is currently being logged into the network, but is being away from the desk. The user is not able to respond for a predetermined period of time, although it is possible to receive a message from the second apparatus user "Not Available" indicates a state where the user is also online, namely is currently being logged into the network, but is being away from the desk for an extended period of time. The user is thus not reachable for a long time, although it is possible to receive a message from the second apparatus user (See Publication 1, for instance). There are further indications that, in addition to state information such as "Online" and "Offline", it is also possible to provide other user-customized special categories of state such as "at work", "at home" and "in a meeting" (See Related Art 2, for instance). However, these indications are not sufficiently specific.

Currently, these types of presence information that require assessment, such as "Away" and "Not Available", are determined by apparatuses themselves based on given settings in many cases. Therefore, erroneous state determinations have been rampant due to discrepancies between actual user states and indicated presence information.

[Related Art 1] Japanese Patent Laid-Open Publication 2004-72485

[Related Art 2] Japanese Patent Laid-Open Publication 2004-318822

[Publication 1] Pocket Studio "Chapter 11, ICQ Setting Preferences", [online], Aug. 30, 2005, Internet <URL: http://pockets.otto.to/~pockets/icq/98a/guide/chap11/b-status.html>

As described above, presence information transmitted between conventional personal computers (PAs) in the system includes basically only four types: "Online", "Offline", "Away" and "Not Available". "Away" and "Not Available" are concepts that incorporate estimations. Although they may match the actual states, there are many cases of mismatches as well.

For instance, a PC or the like automatically changes the state from "Online" to "Away" when the user has not touched a PC mouse or an input key for a predetermined period of time according to a condition to change the state. While the user is touching the mouse or the input key while working on the PC, the user state is "Online". When the user is not working on the PC, the state is changed to "Away" after a predetermined period of time. In this regard, the "Away" state determined on the basis of the operation state of a PC or the like is reasonably accurate, and matches the actual state in most cases. With other communication apparatuses, on the other hand, as can be seen from cases involving wireless communication apparatuses, the user is rarely in need of constantly operating such apparatuses and uses them only when a call or the like is received. As a result, the state tends to change to "Away" very easily with such apparatuses because the user is not constantly touching them even when they are kept in the immediate surroundings of the user. This tendency also applies to "Not Available".

Therefore, in regard to such communication apparatuses, the following determination process is more likely to yield accurate results, rather than determining the "Away" state depending on whether or not the user touches them at will. In this process, the user is determined to be "Away" when there is no response to a certain action performed by a user engaged in a communication with the user, such as IM (instant message) chatting. This also applies to "Not Available".

More specifically, although "Away" and "Not Available" have been conventionally determined solely on the basis of the internal circumstances of each communication apparatus (whether the user has performed any action by operating the apparatus), it is basically more appropriate to determine these states after contact is lost with the second apparatus user. Therefore, it is appropriate to determine that the user is "Away" or "Not Available" when a caller action (e.g., a phone call, a message such as IM, or an alarm on the first apparatus) is not met by a reaction (i.e., a response to the phone call or the message, or stopping the alarm). In the present application, an action means a user operation, a notification from a second apparatus, or an automated process on the first apparatus.

The above-noted determination process can prevent a situation where, since "Away" or "Not Available" appears excessively, the ongoing communication is discontinued or put off until a later day, even when both parties are actually near their apparatuses and are online and available for communication.

On the other hand, although it is appropriate to determine the state after contact is lost with the second apparatus user, there are cases where it is appropriate to determine "Away" or "Not Available" based on the internal circumstances of a PC or the like. In other words, state determination rules vary from apparatus to apparatus and it is thus appropriate to change the setting rules for "Away" and "Not Available" depending on the type of the communication apparatus being used. At the same time, however, communication apparatuses have the common feature of being capable of receiving a call as described above. It is thus deemed more appropriate in many cases to make a state determination after communication is lost with the second apparatus user. Similarily, when there is no reaction to another action from a third party after the action from the original second apparatus user goes unanswered, it can be determined that the user is "Away" or "Not Available". In order to make presence information more user-friendly, it is necessary to create a less error-prone system capable of making more accurate state determinations with respect to presence information that requires assessment, such as "Away" and "Not Available".

SUMMARY OF THE INVENTION

An object of the present invention is to provide a communication apparatus that is capable of accurately determining that an apparatus user is absent.

To achieve the above-described object, the communication apparatus of the present invention includes a communicator configured to communicate with a terminal apparatus and to receive signal from the terminal apparatus, a memory configured to store presence information which indicates that current state of a user of the communication apparatus is first status, and a controller configured to change the presence information according to the signal received by the communicator.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 (b) illustrates a two-way notification process for presence information prerequisite for the present invention;

FIG. 14 (a) illustrates a message from the wireless communication apparatus according to the first embodiment of the present invention;

FIG. 14 (b) illustrates a configuration of a communication packet of the message shown in FIG. 14 (a);

FIG. 20 (b) is a flowchart for determining presence information by using a timer according the second embodiment of the present invention.

DETAILED DESCRIPTION OF PREFERRED EMBODIMENTS

First Embodiment

The first embodiment of the present invention relates to a communication apparatus and a presence information determination method that are capable of accurately determining presence information, e.g., "Away" or "Not Available", which indicate that an apparatus user is absent. "Away" and "Not Available" are used in the following descriptions. As described above, both "Not Available" and "Away" not only refer to a state where the user is absent such as being away from the desk ("Not Available" and "Away" usually refer to this state), but also refer to a state where no operation can be performed since the user is driving, for example. Although "Temporarily away from desk" mainly refers to "Away"; and "Away from desk" mainly refers to "Not Available", they may represent other meanings.

Figure 1:
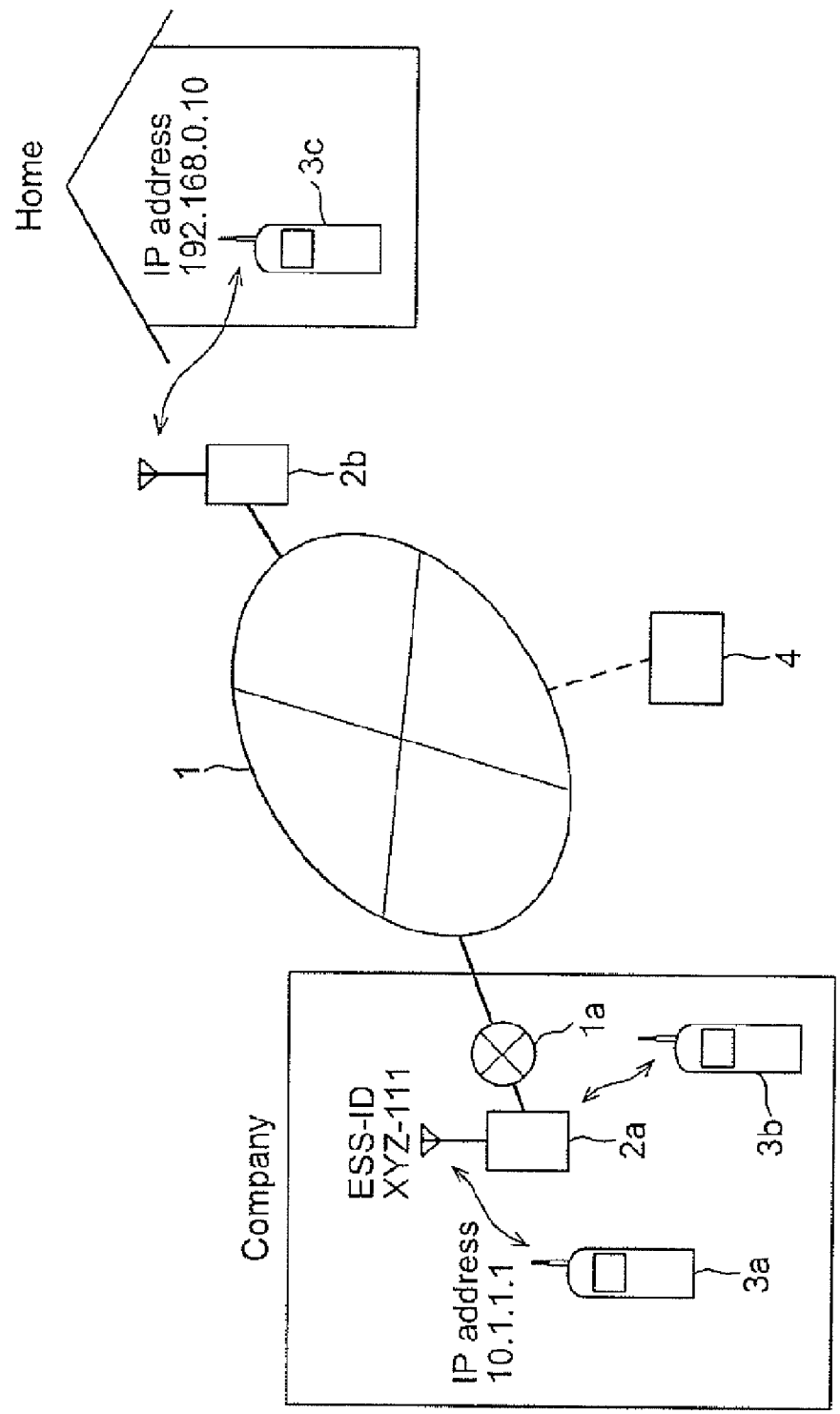
FIG. 1 illustrates a communication system of a wireless communication apparatus according to a first embodiment of the present invention.
Figure 2:
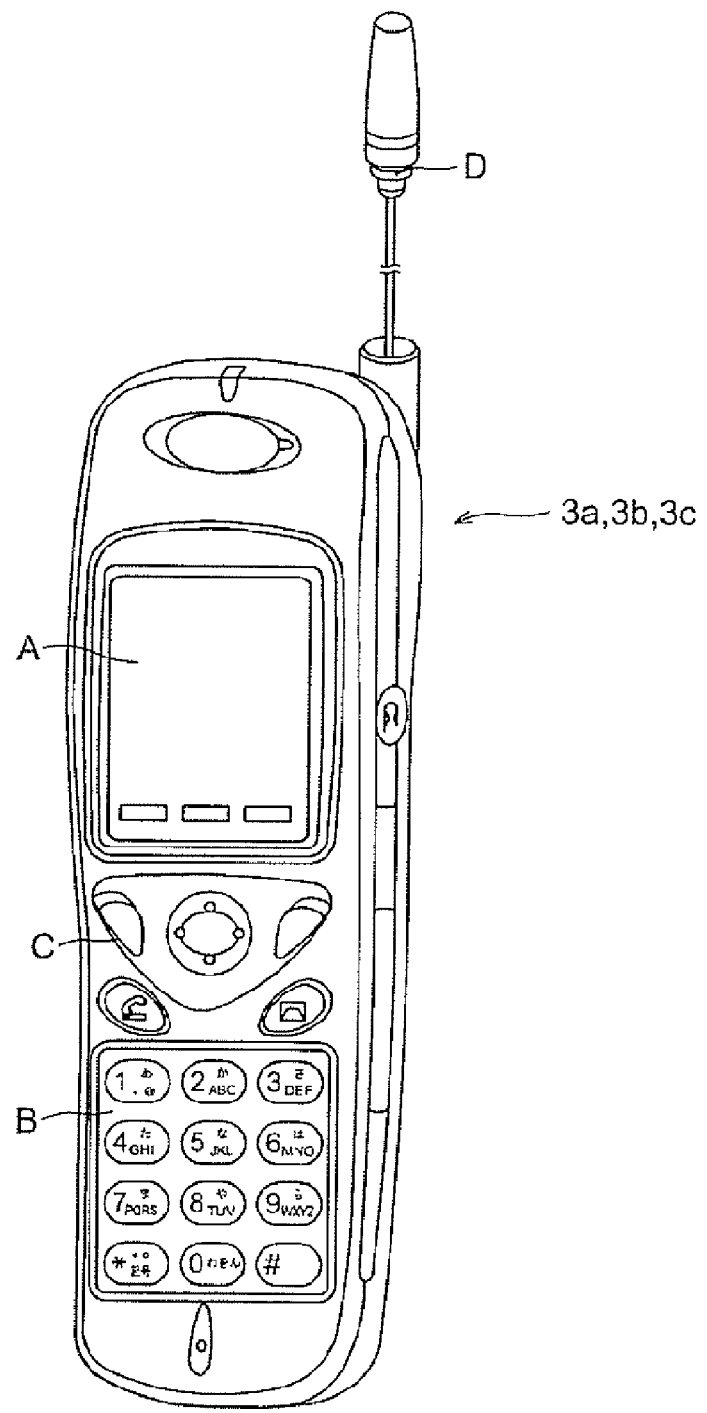
FIG. 2 is an external view of the wireless communication apparatus according to the first embodiment of the present invention.
Figure 3:
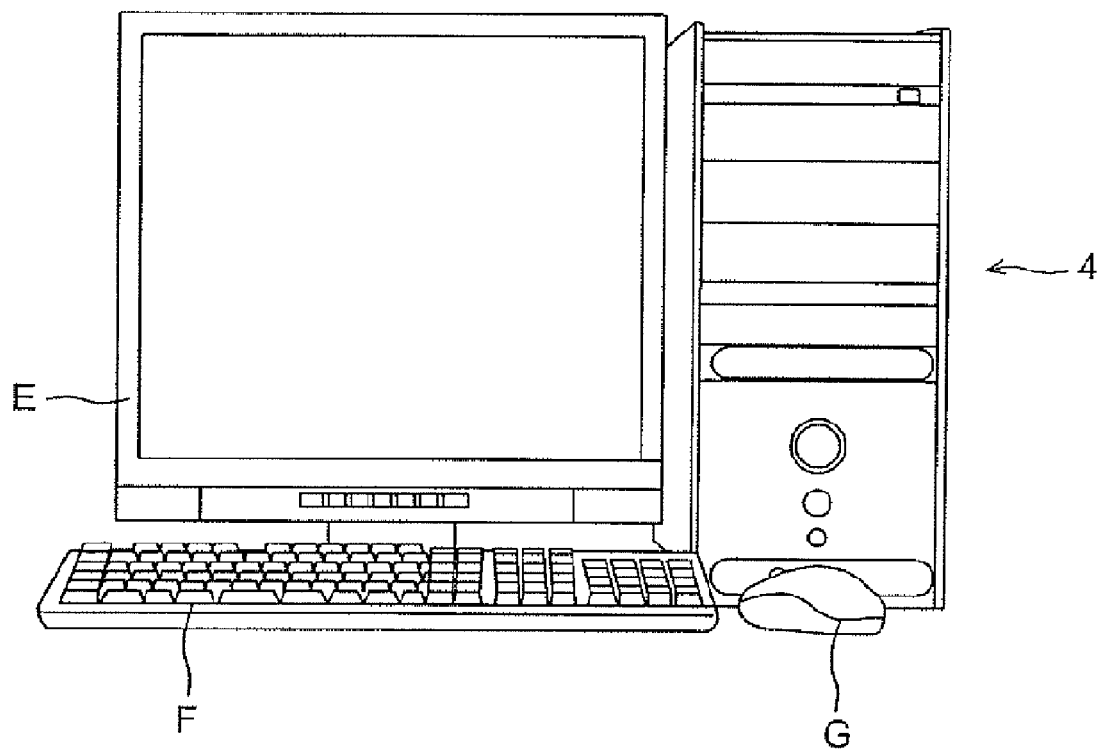
FIG. 3 is an external view of a presence server according to the first embodiment of the present invention.
Figure 4:
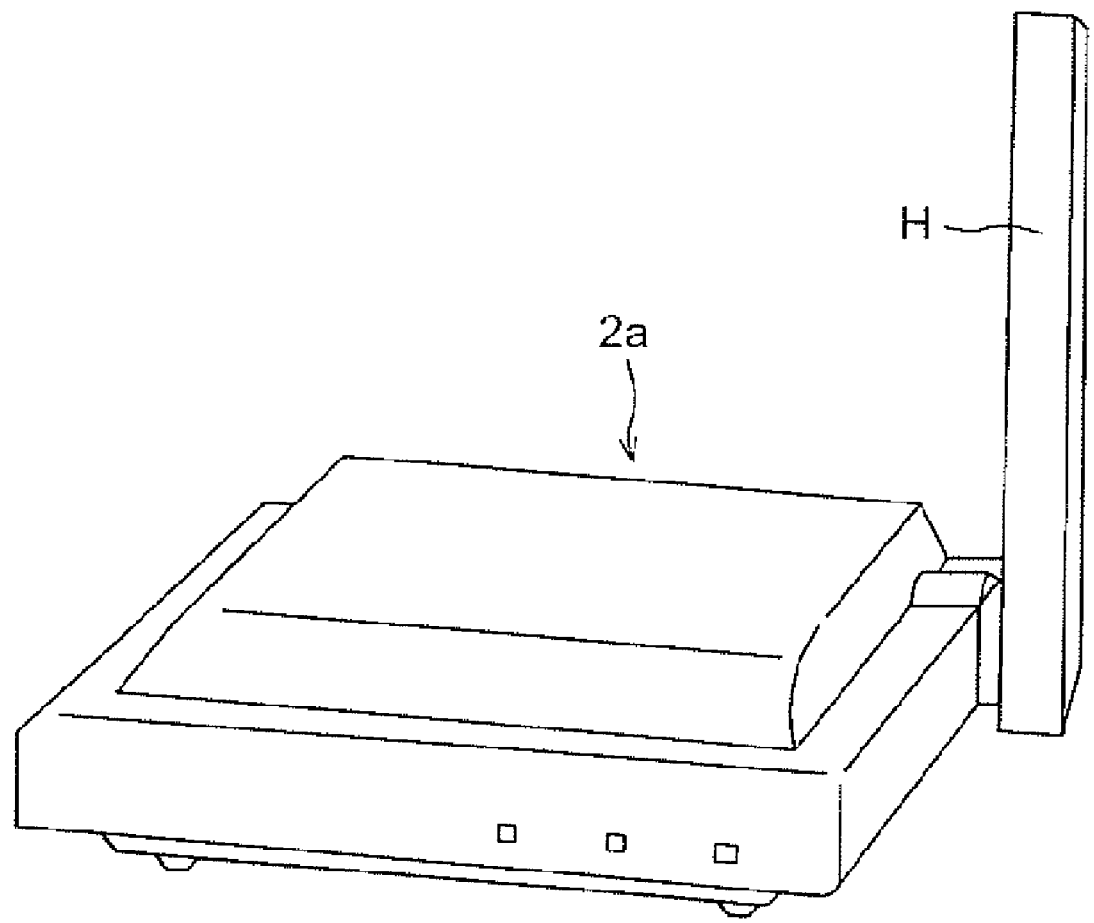
FIG. 4 is an external view of an access point of the first embodiment of the present invention.
Figure 5A:
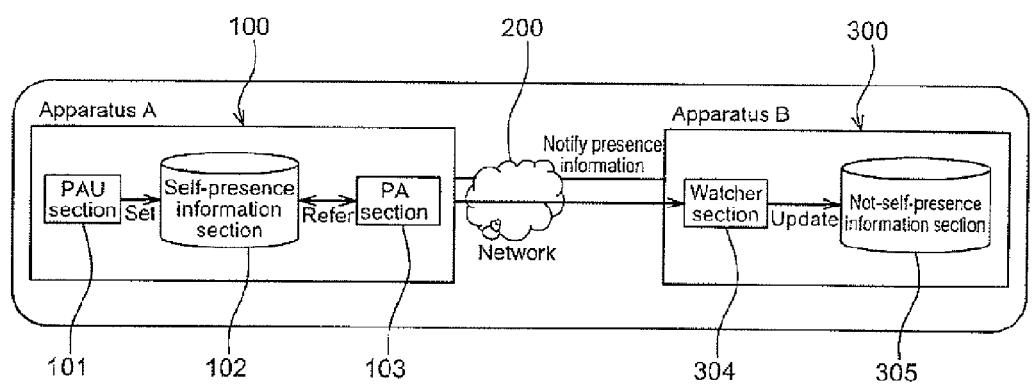
FIG. 5 (a) illustrates a one-way notification process for presence information prerequisite for the present invention.
Figure 5B:
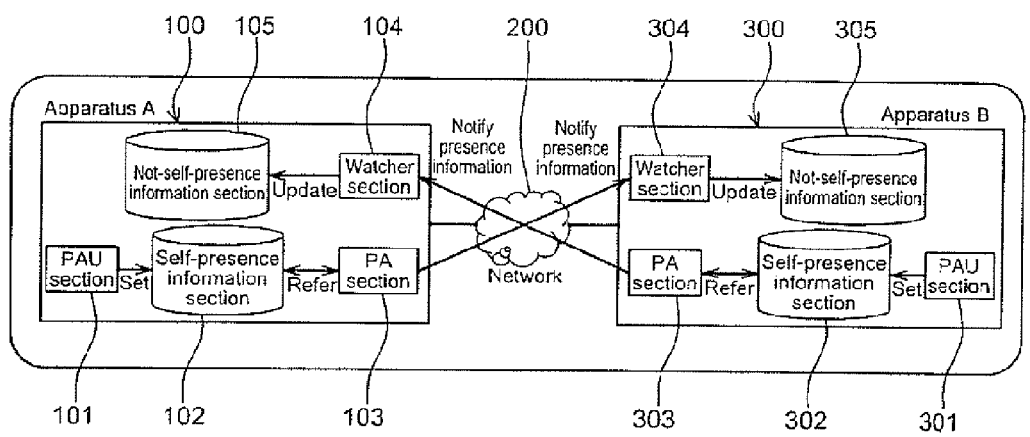
Figure 6:
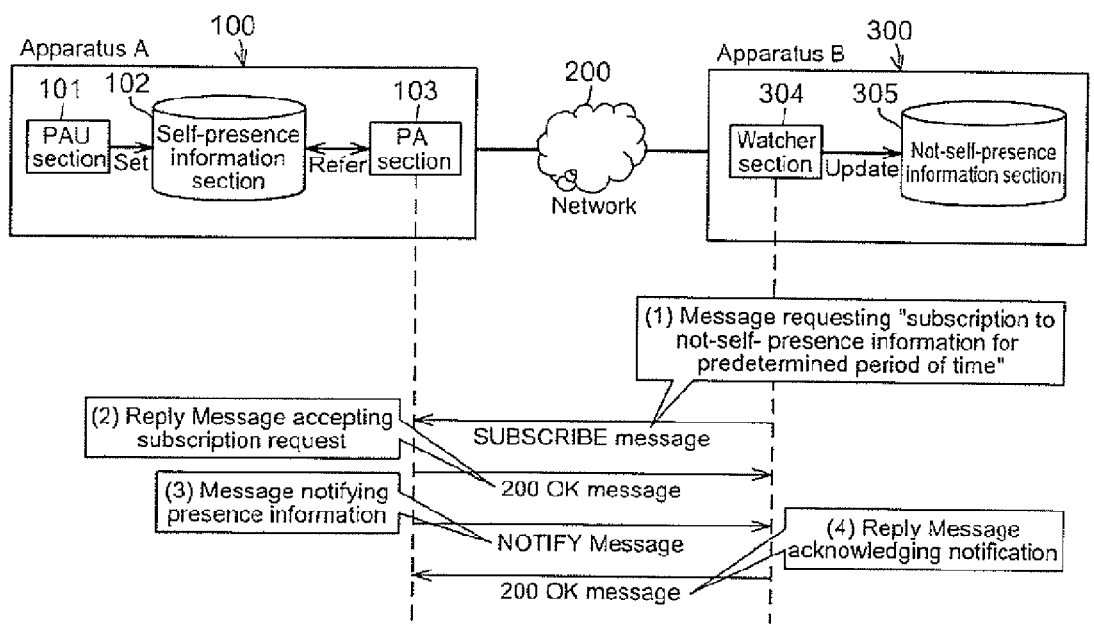
FIG. 6 illustrates a case where a notification is made in response to a request for presence information prerequisite for the present invention.
Figure 7:
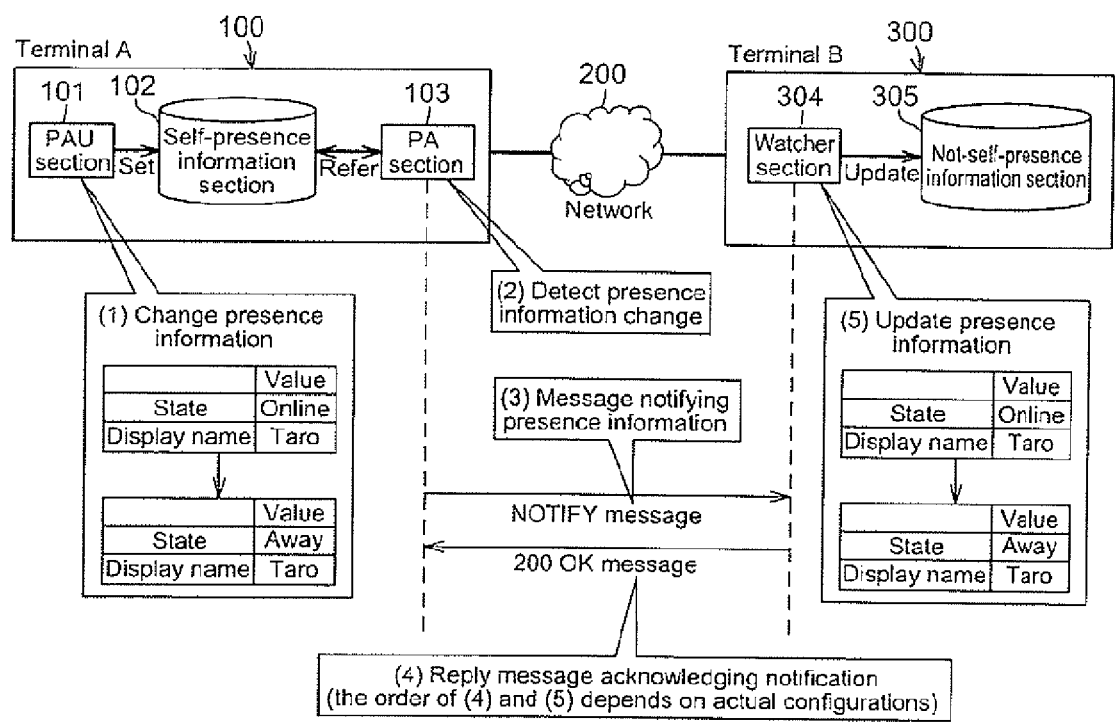
FIG. 7 illustrates a case where a notification is made upon detection of presence information prerequisite for the present invention.
Figure 8:
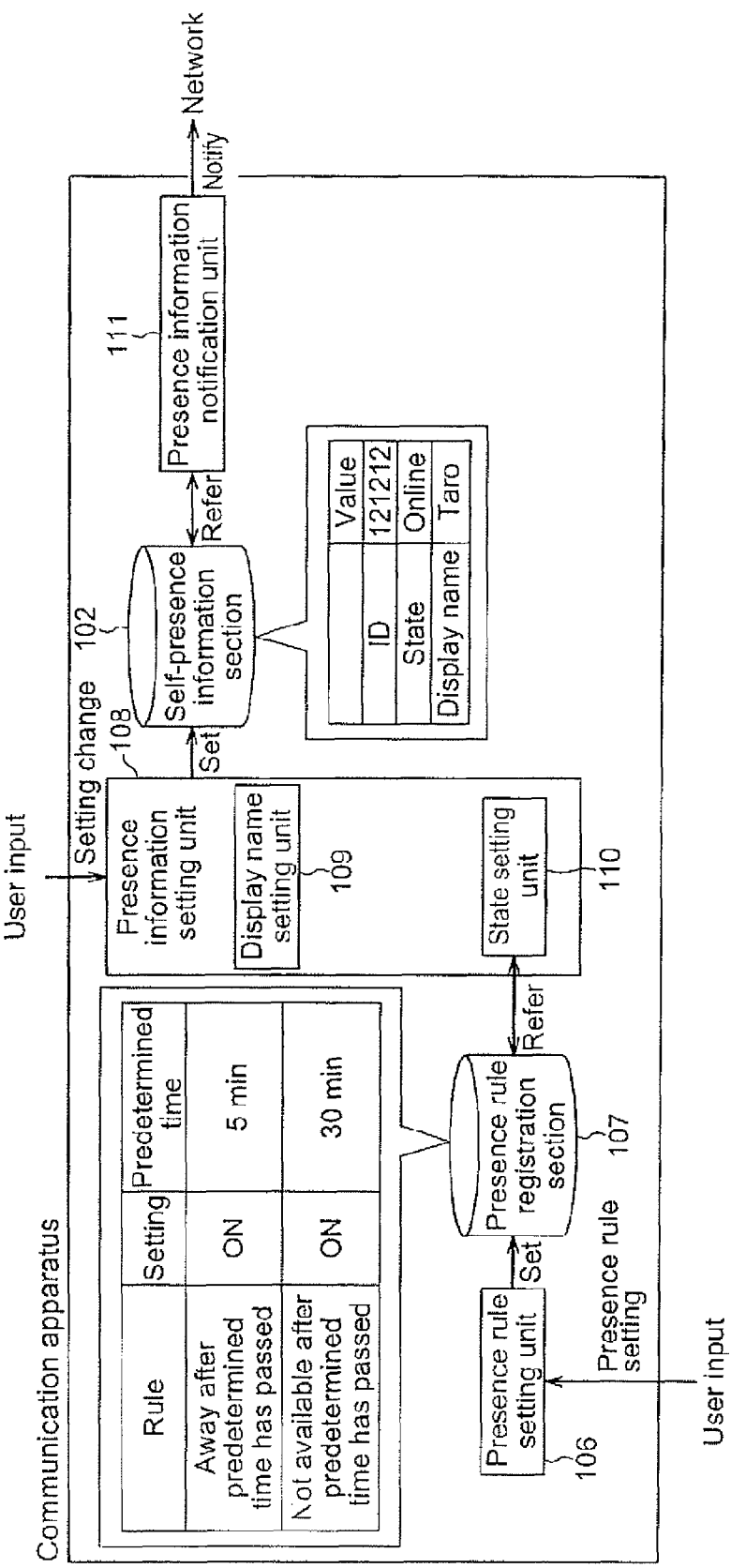
FIG. 8 is a block diagram illustrating presence rule settings for "Away" and "Not Available"
Figure 9:
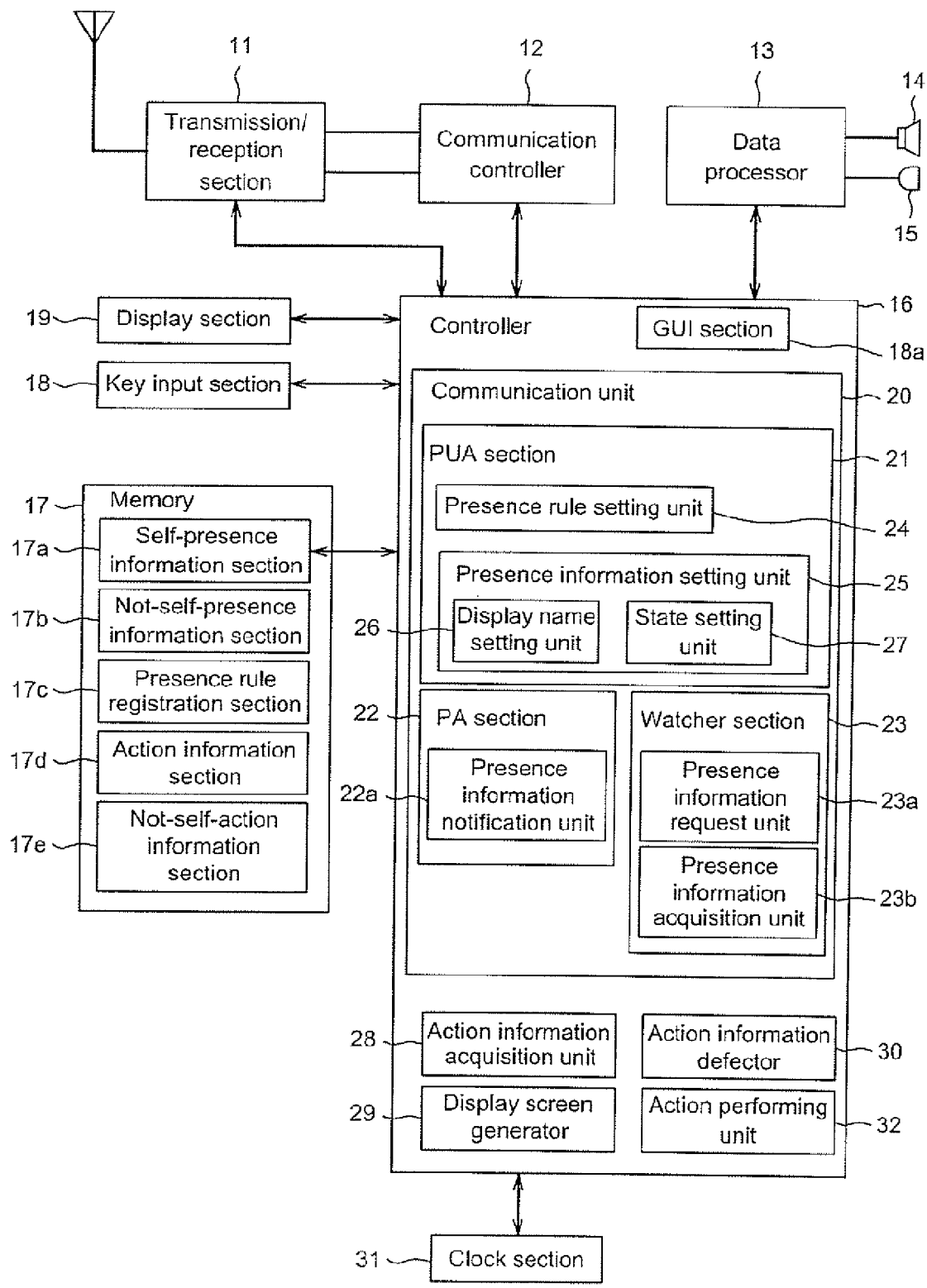
FIG. 9 is a configuration diagram of the wireless communication apparatus according to the first embodiment of the present invention.
Figure 10:
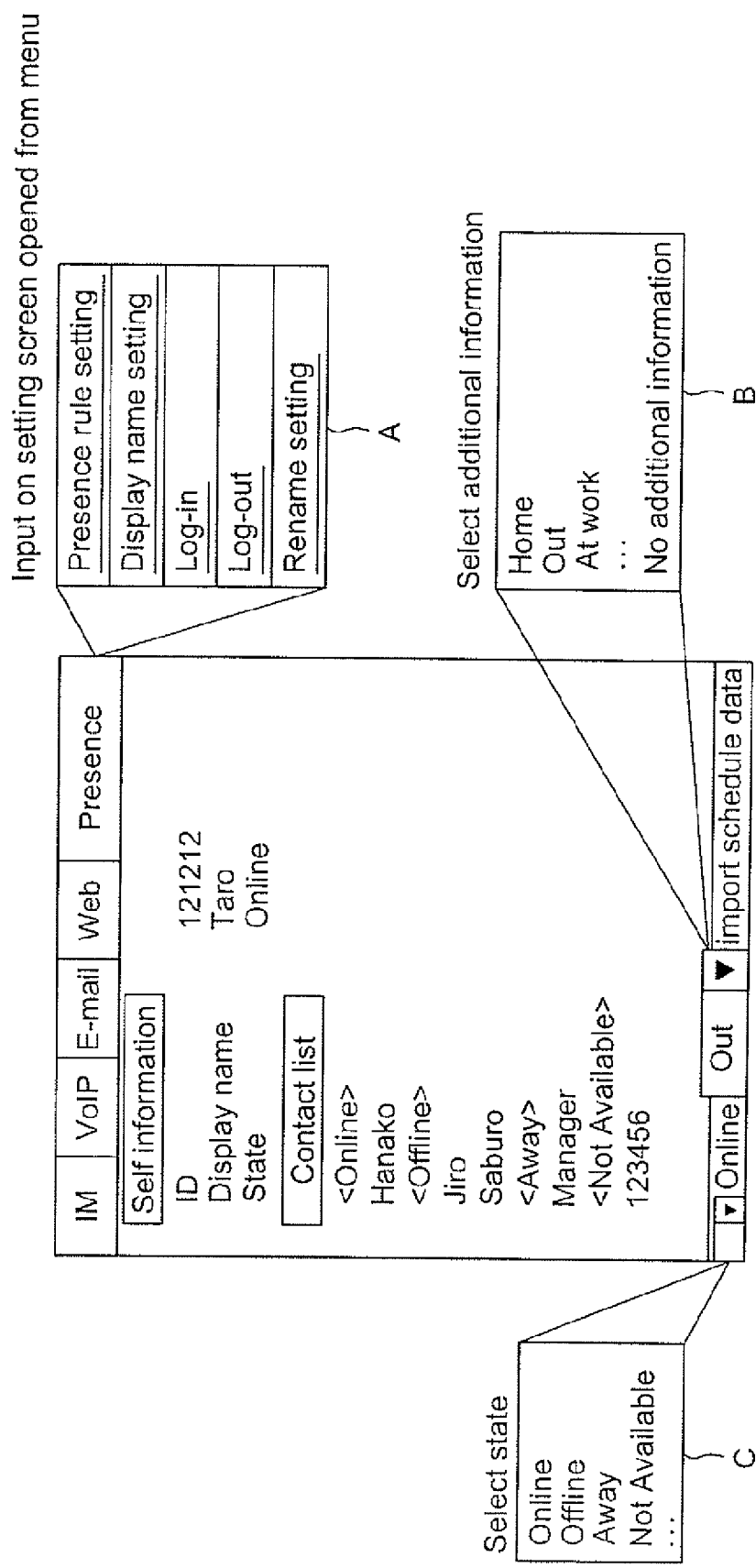
FIG. 10 illustrates a sample of a display screen of the wireless communication apparatus according to the first embodiment of the present invention.
Figure 11:
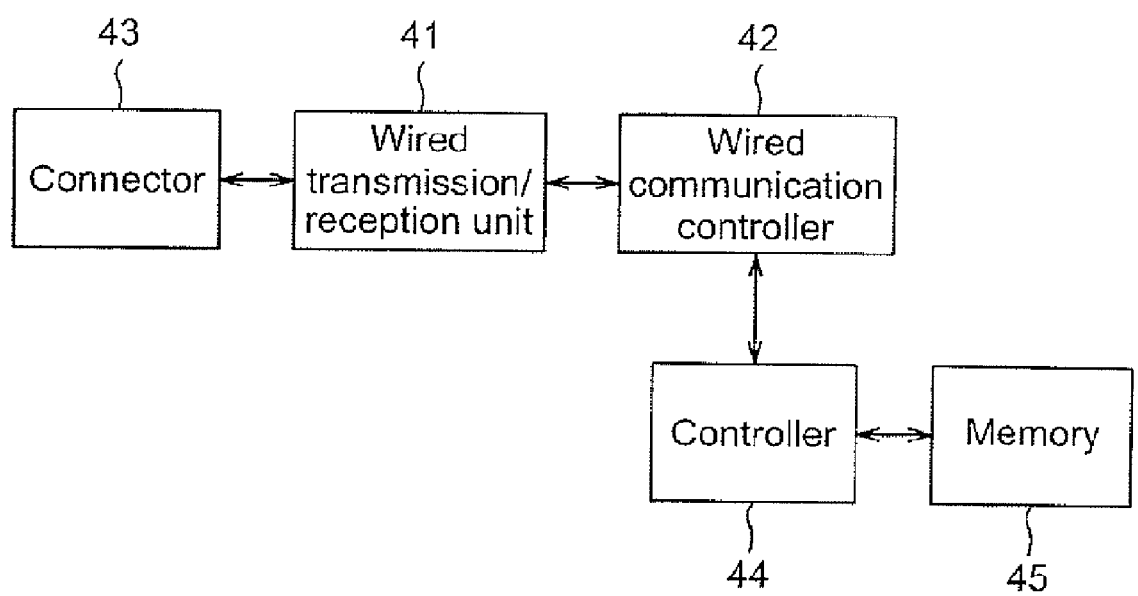
FIG. 11 is a configuration diagram of the presence server according to the first embodiment of the present invention.
Figure 12:
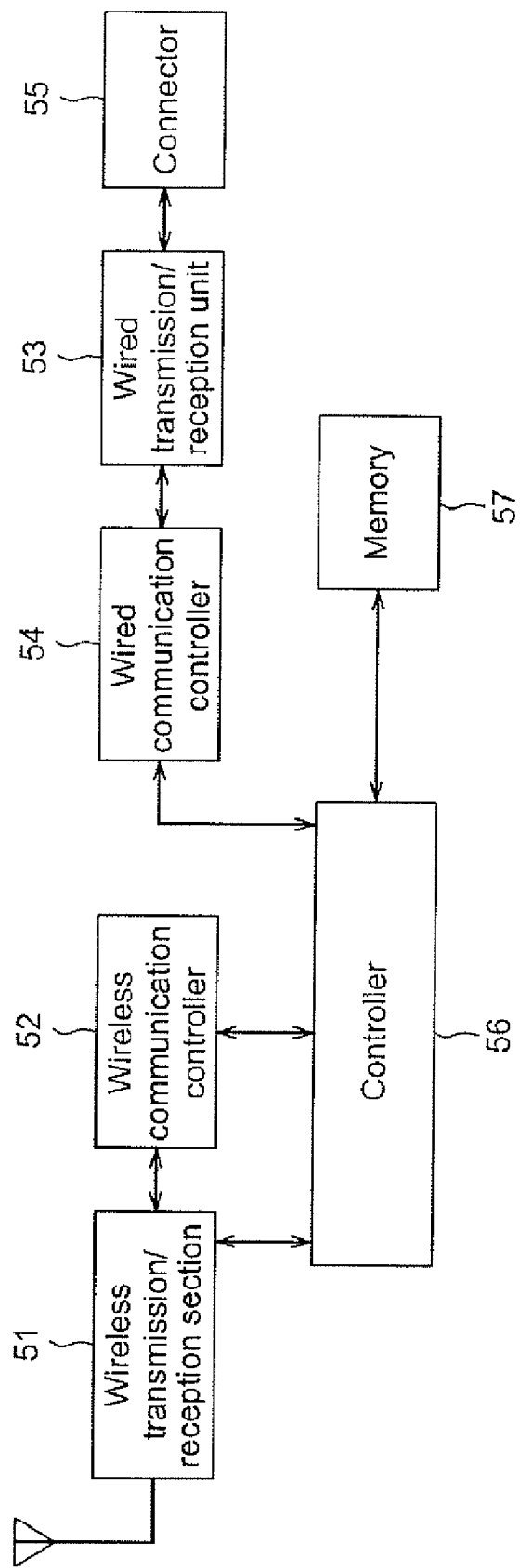
FIG. 12 is a configuration diagram of the access point according to the first embodiment of the present invention.
Figure 13:
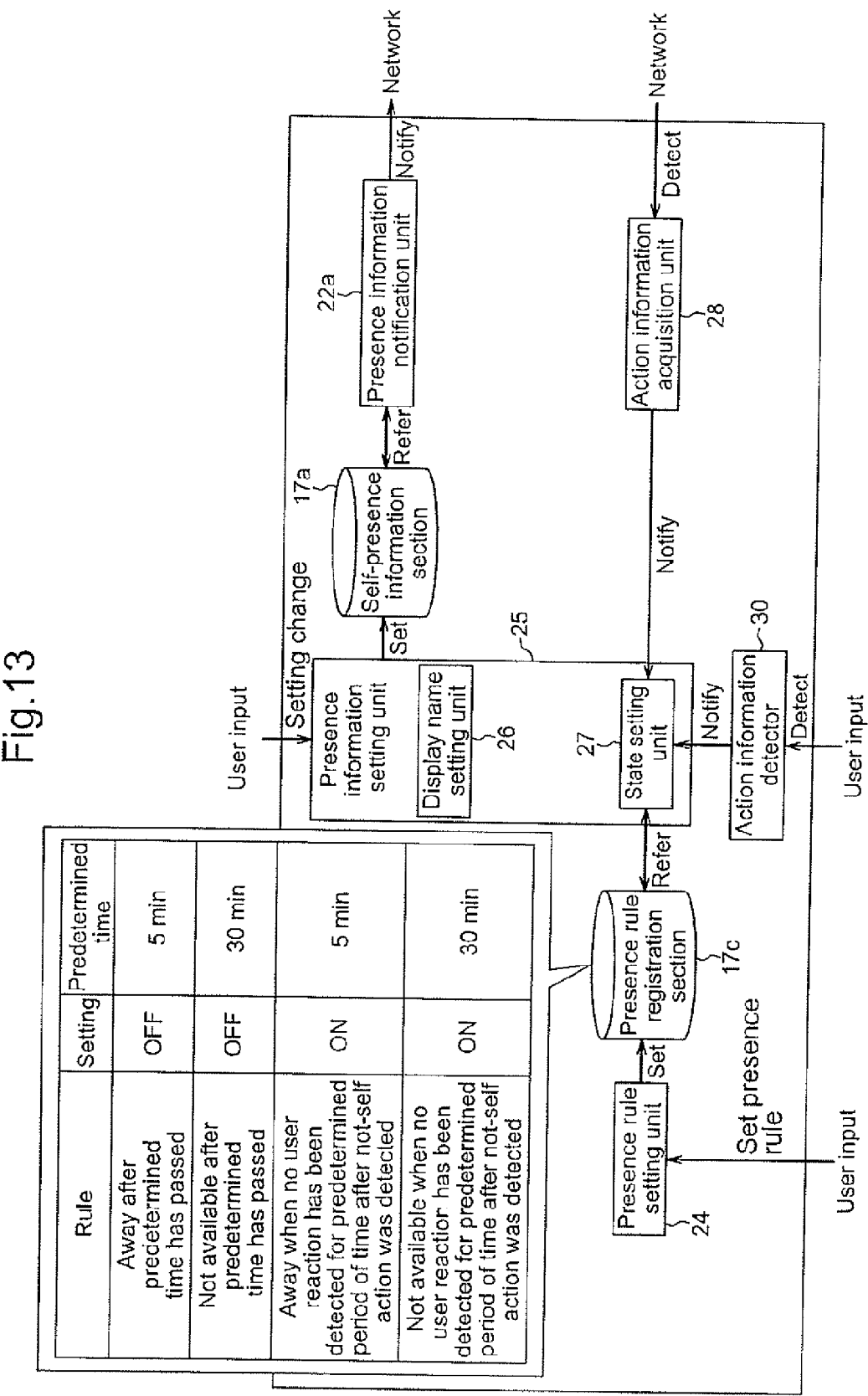
FIG. 13 is a block diagram illustrating a presence function of the wireless communication apparatus according to the first embodiment of the present invention.
Figure 15:
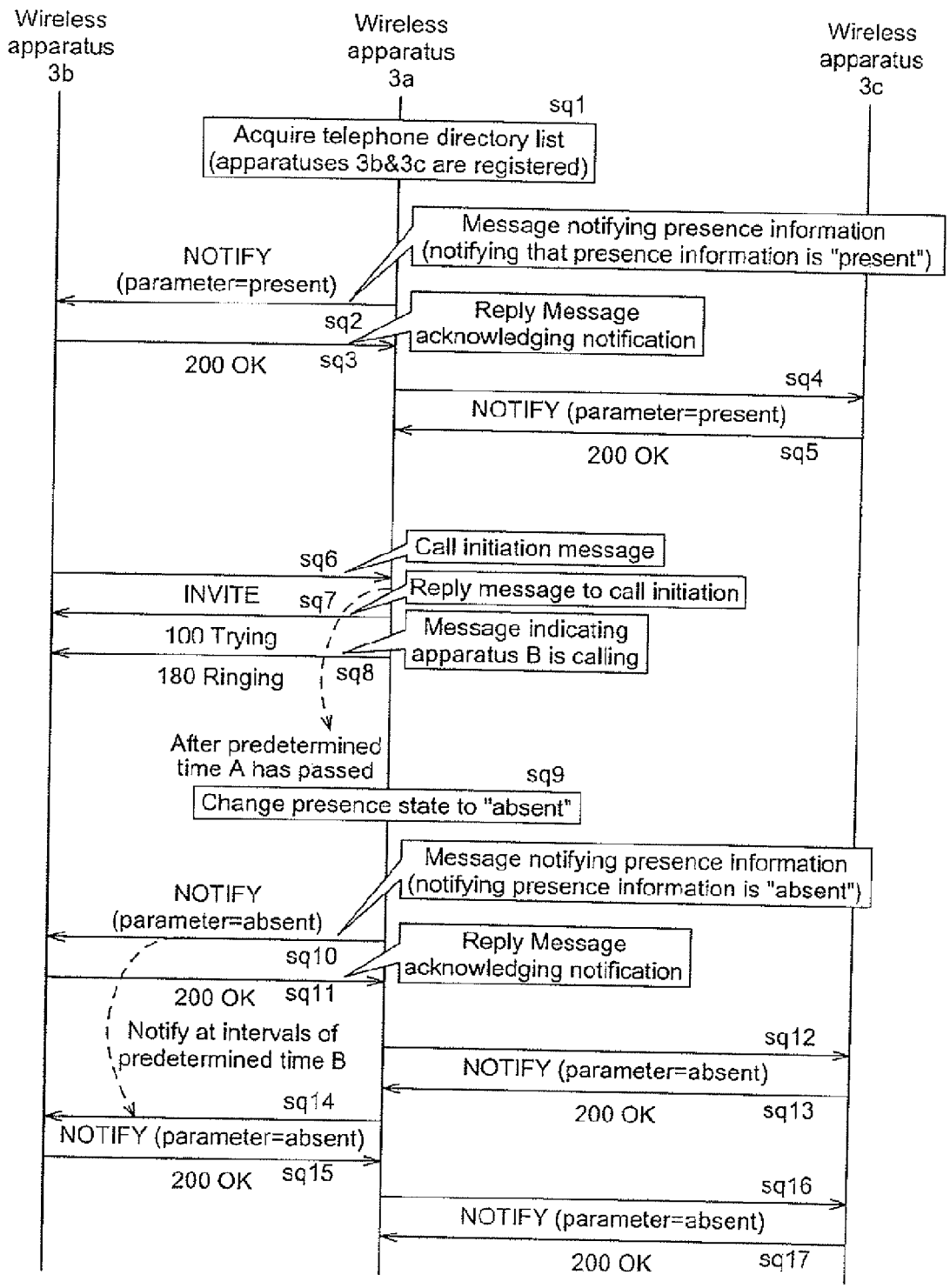
FIG. 15 illustrates a peer-to-peer communication sequence.
Figure 16:
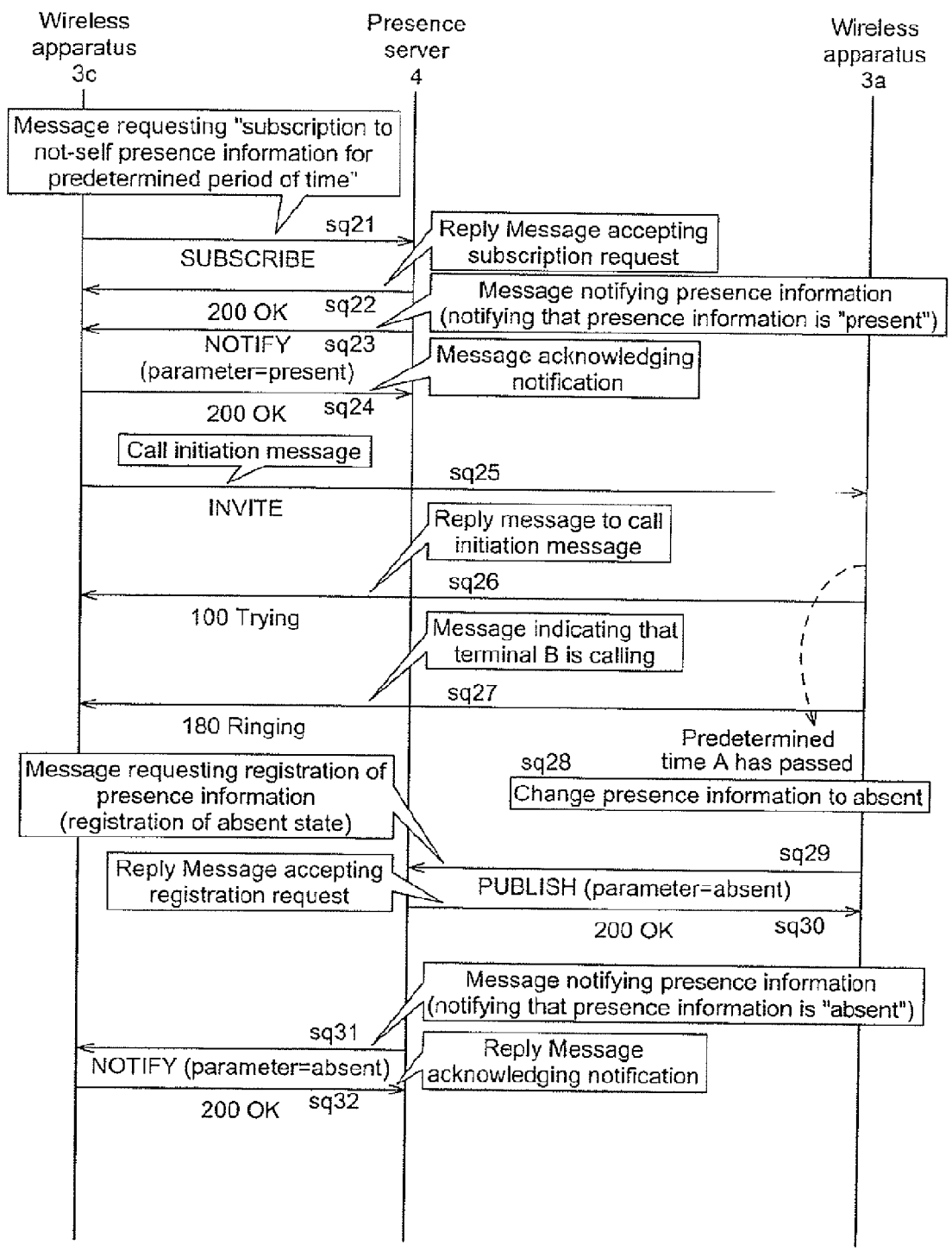
FIG. 16 illustrates a sequence via the presence server according to the first embodiment of the present invention.
Figure 17:
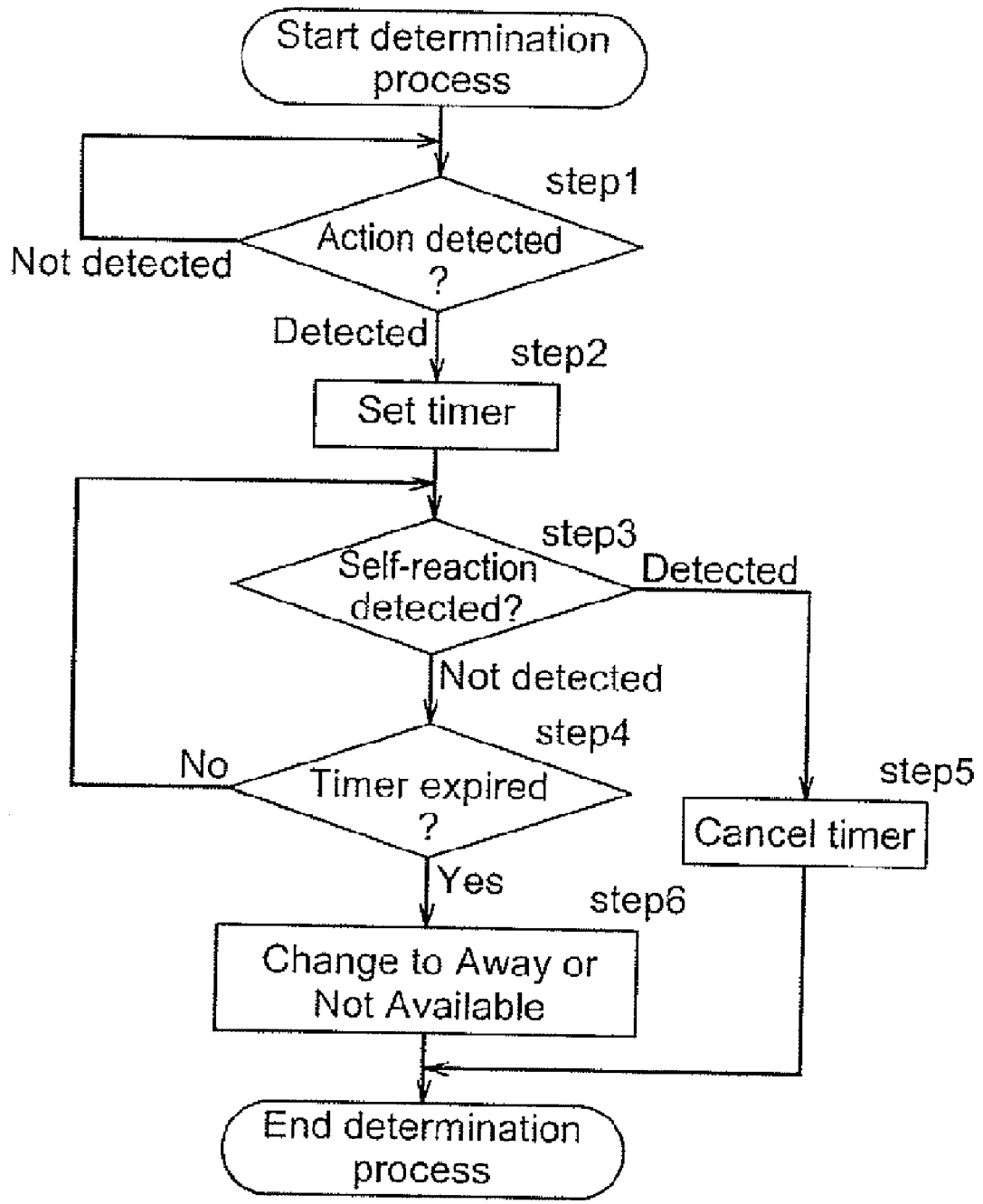
FIG. 17 is a flowchart for determining presence information according to the first embodiment of the present invention.
Figure 18:
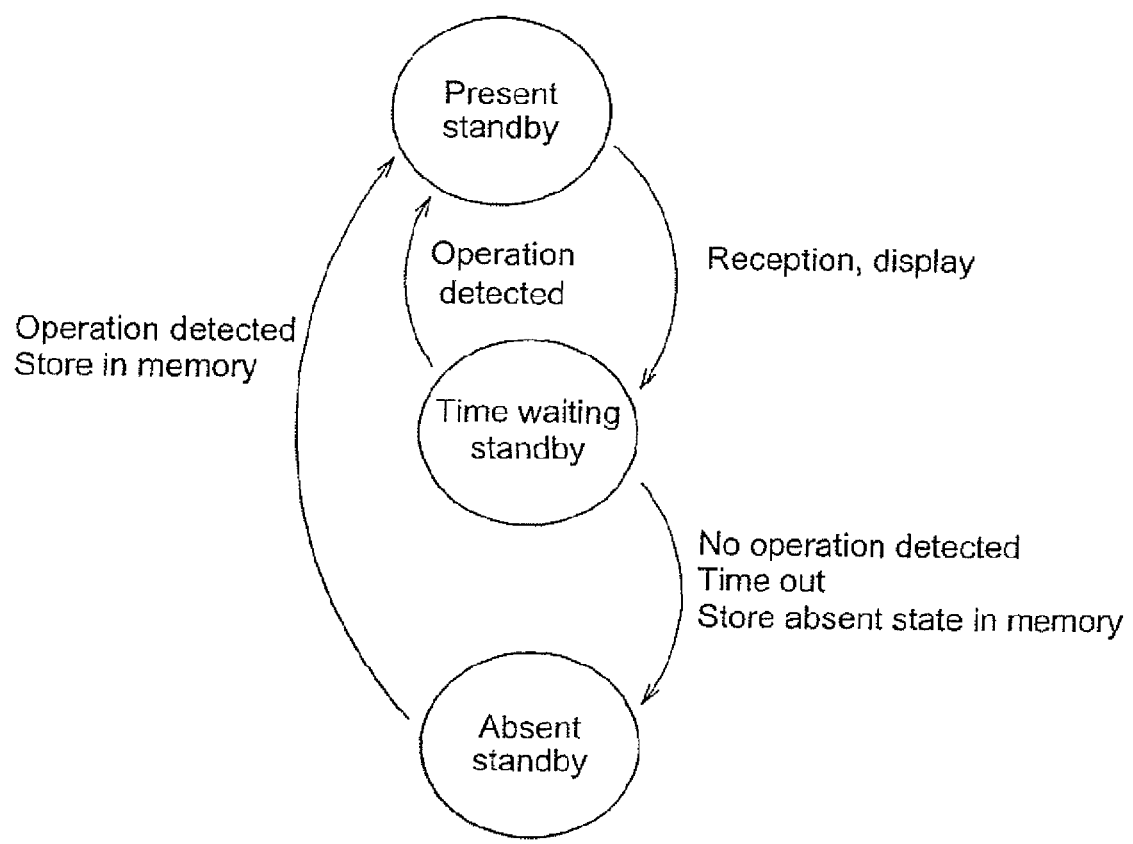
FIG. 18 illustrates a state change of the communication system according to the first embodiment of the present invention.

FIG. 1 illustrates a communication system of a wireless communication apparatus according to the first embodiment of the present invention; FIG. 2 is an external view of the wireless communication apparatus according to the first embodiment of the present invention; FIG. 3 is an external view of a presence server according to the first embodiment of the present invention; FIG. 4 is an external view of an access point of the first embodiment of the present invention; FIG. 5(a) illustrates a one-way notification process for presence information prerequisite for the present invention; FIG. 5(b) illustrates a two-way notification process for presence information prerequisite for the present invention; FIG. 6 illustrates a case where a notification is made in response to a request for presence information prerequisite for the present invention; FIG. 7 illustrates a case where a notification is made upon detection presence information prerequisite for the present invention; FIG. 8 is a block diagram illustrating presence rule settings for "Away" and "Not Available", FIG. 9 is a configuration diagram of the wireless communication apparatus according to the first embodiment of the present invention; FIG. 10 illustrates a sample of a display screen of the wireless communication apparatus according to the first embodiment of the present invention; FIG. 11 is a configuration diagram of the presence server according to the first embodiment of the present invention; FIG. 12 is a configuration diagram of the access point according to the first embodiment of the present invention; FIG. 13 is a block diagram illustrating a presence function of the wireless communication apparatus according to the first embodiment of the present invention; FIG. 14(a) illustrates a message from the wireless communication apparatus according to the first embodiment of the present invention; FIG. 14(b) illustrates a configuration of a communication packet of the message shown in FIG. 14(a); FIG. 15 illustrates a peer-to-peer communication sequence; FIG. 16 illustrates a sequence via the presence server according to the first embodiment of the present invention, FIG. 17 is a flowchart for determining presence information according to the first embodiment of the present invention; and FIG. 18 illustrates a state change of the communication system according to the first embodiment of the present invention.

In FIG. 1, 1 is an IP network such as the Internet or an intranet; and 1a is a wireless LAN that performs communication by being connected to IP network 1. 2a and 2b are access points; and 3a, 3b and 3c are wireless communication apparatuses (communication apparatuses of the present invention), such as WiFi (registered trademark in Japan) phones, which perform communication according to a protocol defined in IEEE 802.11a/g.

Wireless communication apparatuses 3a, 3b and 3c are provided with displays A such as LCDs (Liquid Crystal Displays), as well as 12 keys B, function keys C and antennas D. The display screen of display A displays self-presence information and presence information of members on a contact list shown in FIG. 10. The display screen further displays a button input through a GUI for receiving various services including 1M, VoIP, e-mail, Web connection, and presence information notification.

Further, 4 is a presence server that notifies requested presence information by performing communication according to a protocol such as SIP (Session Initiation Protocol), or the like. FIG. 3 shows an example of presence server 4, which provides various services. Presence server 4 shown in FIG. 3 is provided with display E, keyboard F and mouse G. Presence server 4 becomes unnecessary for peer-to-peer communication described in the first embodiment (described later). Although wireless communication is described in the first embodiment, other types of communication such as wired communication can also be used as long as the communication system has a presence function, Further, although SIP is mainly described in the following, any types of protocol other than SIP such as RVP (propounded by Microsoft Corporation) can be used as long as it is capable of notifying presence information.

Access point 2a is provided at a plurality of locations in an office, for instance, and builds wireless LAN 1a including a plurality of areas, so that wireless communication apparatuses 3a and 3b in each area can be wirelessly connected. FIG. 4 illustrates an example of access point 2a provided with antenna H. Access point 2b, which is connected to IP network 1, can be wirelessly connected to wireless communication apparatus 3c at home. In FIG. 1, an ESS-ID of access point 2a is "XYZ-111"; and a local IP address of wireless communication apparatus 3a is "10.1.1.1", for instance, and an IP address of wireless communication apparatus 3c as "192.168.0.10".

Prior to providing detailed descriptions of the communication apparatus that provides presence information and the presence information determination method according to the first embodiment of the present invention, a description is provided on a presence information notification system through peer-to-peer communication in accordance with RFC. FIG. 5(a) illustrates a one-way notification process for presence information; and FIG. 5(b) illustrates a two-way notification process for presence information. Although peer-to-peer communication is described in the following, a presence server can also be involved for communication.

In FIG. 5(a), 100 is apparatus A on the transmitting end; 101 is a presence user agent (hereinafter referred to as a PUA) section that provides presence information to a presence system; 102 is a self-presence information section that stores self-presence information; and 13 is a presence agent (PA) section that processes a subscribe request or generates a notification in accordance with a presence state change. Here, although a description is provided using SIP as a protocol, arbitrarily-selected protocol can be used as long as it is capable of exchanging presence information by using IP packets.

200 is a network such as an IP network. 300 is apparatus B on the receiving end. 304 is a watcher section that monitors presence information from PA section 103. 305 is a not-self-presence information section that stores notified not-self-presence information. In FIG. 5(b) illustrating a two-way notification process, 104 is a watcher section of the apparatus on the transmitting end; 105 is a not-presence information section of the apparatus on the transmitting end; 301 is a PUA section of the apparatus on the receiving end; and 302 is a self-presence information section of the apparatus on the receiving end; and 303 is a PA section of the apparatus on the receiving end.

First, a description is provided for case 1 where apparatus B300 sends a presence information request to apparatus A100 on the other end, and apparatus A100 notifies requested presence information. FIG. 6 illustrates, as a prerequisite for the present invention, a case where a notification is made in response to a presence information request. In FIG. 6, PUA section 101 of apparatus A100 sets presence information in self-presence information section 102. In this state, apparatus 8300 transmits, to apparatus A100, a "SUBSCRIBE" message requesting subscription to not-self-presence information for a predetermined period of time (sequence 1); PA section 103, upon receiving the message, transmits a "200 OK" message when accepting the subscription request (sequence 2); and apparatus A100 transmits a "NOTIFY" message notifying its presence information (sequence 3). In response, apparatus B300 transmits, to apparatus A100, a "200 OK" message acknowledging the notification message (sequence 4). Watcher section 304 of apparatus B300 updates information stored in not-self-presence information section 305 with the received presence information of apparatus A100.

Next, a description is provided for case 2 where apparatus A100 notifies apparatus B300 of changes of its presence information due to certain events, after detecting the same. FIG. 7 illustrates, as a prerequisite for the present invention, a case where a notification is made upon detecting presence information. As shown in FIG. 7, upon detecting a state change of apparatus A100, PUA section 101 of apparatus A100 changes its presence information (sequence 1). Here, the presence information of apparatus A100 is changed from, for instance, "Online" to "Away". Upon detecting this state change (sequence 2), PA section 103 sends to apparatus B300 a "NOTIFY" message notifying the changed presence information (sequence 3). Upon receiving the "NOTIFY" message, watcher section 304 of apparatus 3300 sends a "200 OK" message to apparatus A100 (sequence 4). Watcher section 304 then updates the information stored in not-self-presence information section 305 based on the received presence information of apparatus A100 (sequence 5). Accordingly, the presence state of apparatus A100 stored in not-self-presence information section 305 is changed from "Online" to "Away". Sequences 4 and 5 can be reversed depending on actual configurations.

Next, a description is provided for configurations for setting "Away" and "Not Available". FIG. 8 is a block diagram illustrating presence rule settings for "Away" and "Not Available". In FIG. 8, 106 is a presence rule setting unit that sets rules using a presence setting mode; and 107 is a presence rule registration section. Presence rule setting unit 106 sets, for instance, "5 minutes" as a predetermined period of time for "Away", and "30 minutes" as a long predetermined period of time for "Not Available" for each user. Presence rule registration section 107 registers presence rules set as described above.

108 is a presence information setting unit that sets self-presence information; 109 is a display name setting unit that sets a display name for this setting; and 110 is a state setting unit that determines and sets a presence state of the first apparatus, e.g., "Online" or "Offline", as well as "Away" or "Not Available" when no operation is performed for a predetermined period of time.

For presence information setting, input is made through a key input section or a graphical user interface (hereinafter referred to as a "GUI"). Based on the input display name or presence rule, the presence state determined by state setting unit 110 is stored in self-presence information section 102. Presence information notification unit 111 as a PA section notifies the second apparatus watcher section of the presence information.

In the communication system of FIG. 1, as can be seen by the above descriptions, presence information is changed in the following two cases. The first case pertains to a situation where wireless communication apparatus 3a sends, to wireless communication apparatus 3b, a message requesting subscription to presence information; and wireless communication apparatus 3b, upon receiving the request, notifies wireless communication apparatus 3a of its presence information when accepting the subscription request, and wireless communication apparatus 3a updates the stored presence information. The second case pertains to a situation where wireless communication apparatus 3a, upon detecting a presence state change of its own, notifies wireless communication apparatus 3b of the changed presence state. In both cases, a presence state determined by state setting unit 110 of FIG. 8 is stored, according to the presence rule, in self-presence information section 102 as its presence information, and presence information notification unit 111 notifies the second apparatus watcher section of the presence information. This process represents the basic structure of the presence system.

The following describes in detail the communication apparatus and the presence information determination method that provide presence information according to the first embodiment of the present invention. First, a description is provided for the configuration of the wireless communication apparatus described in the first embodiment. In FIG. 9, 11 is a transmission/reception section; 12 is a communication controller; and 13 is a data processor that encodes/decodes a signal though compression/decompression. Transmission/reception section 11 includes a frequency transformer and a modulation/demodulation section (not shown). A receiver of the frequency transformer performs frequency transform of a signal received by an antenna into an intermediate frequency signal (IF signal) by mixing the received signal with a vibration signal of a predetermined frequency. A transmitter of the frequency transformer performs frequency transform of a modulation wave supplied by the modulation/demodulation section (described later) by mixing the wave with a vibration signal of a predetermined frequency, and outputs the wave from the antenna. The receiver of the modulation/demodulation section demodulates an IF signal output from the frequency transformer, and transmits the demodulated IF signal to communication controller 12. The transmitter of the modulation/demodulation section modulates data supplied by communication controller 12 and transmits the modulated data to the frequency transformer of transmission/reception section 11.

Next, communication controller 12 performs frame synchronization and frame format processes. The receiving end of communication controller 12 retrieves one-frame data at a predetermined timing from received data supplied by the modulation/demodulation section of transmission/reception section 11; unscrambles the data or performs other processes on the data; and transmits data in a higher layer to controller 16 (described later). Controller 16 further transmits by communication section 20 (described later) various data including multimedia data such as VoIP voice signals in RTP payload format and MPEG image signals, and IM text data, On the transmitting end of communication controller 12, for data supplied by data processor 13, communication unit 20 converts data into IP packets with header attachments, and communication controller 12 scrambles the data, of which each frame is transmitted at a predetermined timing to the modulation/demodulation section of transmission/reception section 11.

Next, data processor 13 decodes and extends multimedia data and the like supplied by communication unit 20 on the receiving end, and converts the data into analog sound signals, video signals, IM text data or the like through D/A conversion in order to output the data through speaker 14 and display section 19 (described later). The display device of the present invention refers to speaker 14 or display section 19. Displayed contents include voice, images, letters and the like. On the transmitting end of data processor 13, analog sound signals input through microphone 15 or video signals from a camera or the like (not shown), and key input signals through key input section 18 are converted into data signals through A/D conversion. At the same time, the converted data signals are encoded and compressed, and sent to communication unit 20, which transmits the data signals to communication controller 12 as IP packets.

Further, 16 is a controller; 17 is a memory; 17a is a self-presence information section that is provided in memory 17, and that stores self-presence information; and 17b is a not-self-presence information section that stores not-self-presence information. 17c is a presence rule registration section that sets rules for setting conditions of presence information, i.e., "Online", "Offline", "Away", and "Not available". Functions of self-presence information section 17a, not-self-presence information section 17b and presence rule registration section 17c are basically identical to those of self-presence information section 102, not-self-presence information section 305 and presence rule registration section 107 of the technology described with reference to FIGS. 5 through 8.

In the first embodiment, it is possible to set two types of conditions for "Away" by selecting a mode. A first setting method relates to the technology, in which presence information is changed to "Away" when the first apparatus user is logged into the presence system, but the user performs no action during a predetermined period of time. This setting is useful when used for a PC or the like (used for other activities than communication). A second setting method relates to the technology in which presence information is changed to "Away" when the first apparatus user is logged into the presence system, but performs no action during a predetermined period of time after the second apparatus, the server or the first apparatus performs an action in anticipation of some reaction.

The first setting pertains to a situation where the user is briefly away from the desk. For instance, approximately "5 minutes" is set as a predetermined period of time. The second setting, on the other hand, pertains to a situation where the presence information is changed to "Away" when the user performs no action after a VoIP reception, an IM reception, an update from a version control server or another server, an alarm operation from the first apparatus, or display of such actions (the VoIP reception, the IM reception, the update or the alarm operation) is made. Such receptions and updates can be referred to as action information for the second apparatus to seek some actions from the user; and an alarm operation can be referred to as action information based on operations of the first apparatus. The second setting pertains to a situation where the presence information is changed to "Away" after a predetermined time has passed when either one of these two types of action information can be obtained. In the following, these operations of the second and first apparatuses are called "not self action".

Similarly, two types of conditions can be set for "Not Available". The first setting method relates to the technology in which the presence information is changed to "Not Available" when the first apparatus user performs no action for a long period of time while logged in to the network. This is useful when used for a PC or the like. The second setting method is whereby the presence information is changed to "Not Available" when the first apparatus user is logged into the presence system, but performs no action for a long period of time, after the second apparatus, the server or the first apparatus performs an action in anticipation of some reaction. In both cases, a period of time suitable for a characterization of the user's absence, for instance, approximately "30 minutes", is set for state determination. Therefore, the difference between "Away" and "Not Available" hinges on the difference of elapsed time between two cases, i.e., whether the elapsed time is within a range which justifies a characterization of the user's absence as simply being away from the desk, or the elapsed time is long enough to justify a characterization of the users absence as not readily reachable, FIG. 8 shows a case where the second setting is ON, and the first setting is OFF for "Away" and "Not Available". "Away" and "Not Available" used in the above-described second setting method correspond to information indicating the user is absent according to the present invention.

Further descriptions of FIG. 9 are followed. 17d is an action information section that stores action information, the action being performed as user's reaction (action triggered by other's action) in response to the action performed in anticipation of some user's reaction from the second apparatus, the server or the first apparatus, such as a VoIP reception, an IM reception, a file transfer request, or an alarm operation, or in response to display of such performed actions on the first apparatus. Action information stored in action information section 17d is acquired by action information detector 30. Types of actions include a VoIP response, an IM response, a file transfer, an input operation of canceling alarm or the like, and ON/OFF operations (not shown).

Upon acquiring action information of the second apparatus or the first apparatus, action information acquisition unit 28 operates clock section 31 after setting action information, flags and the like to not self action information section 17e (described later). Or, action information acquisition unit 28 operates clock section 31 immediately after acquiring action information. In the latter case, therefore, action information section 17d and opposing action information section 17e become unnecessary. However, for a case where the presence display function is reset for some reason while logged into the presence system, setting flags or the like makes it possible to redisplay "Away" or "Not Available" while the previous state remains by using the action information and the like set in action information section 17d.

17e is an opposing action information section that stores action information when the second apparatus, presence server 4 or the first apparatus performs an action in anticipation of some reaction. As described above, opposing action information section 17e can be omitted. Opposing action information section 17e stores various information including action information such as a VoIP reception, an IM reception, and a file transfer request, and action information such as an update or ether notification from the version control server or another server, and an alarm operation from the first apparatus.

In the first embodiment, the second setting method is used for settings. Therefore, action information acquisition unit 28 (described later) monitors predetermined operations (actions) including an action from the second apparatus user of the second apparatus or presence server 4, or an alarm operation of action performing unit 32 (described later) of the first apparatus, such as an alarm operation. Action information acquisition unit 28 then starts counting at clock section 31 upon detecting a VoIP reception, an IM reception, a file transfer request or the like from the second apparatus, an update notification from the version control server or another server, or an alarm operation and the like of the first apparatus. In addition, action information acquisition unit 28 also starts counting at clock section 31 upon displaying the actions such as the VoIP reception, the IM reception, the file transfer request, the update notification or the alarm operation, on the first apparatus. Here, it is also possible to change the action information of opposing action information section 17e. After clock section 31 counts up the periods of time set for "Away" and "Not Available", action information acquisition unit 28 notifies state setting unit 27 of the first apparatus of the time expiration, and state setting unit 27 changes the presence information of self-presence information section 17a from "Online"; to "Away" or "Not Available".

In the first setting method, the user is logged into the presence system. However, when the first apparatus user stops performing any action, clock section 31 starts the counting process. In this case, when the time set for "Away" and "Not Available" have passed, state setting unit 27 of the first apparatus is notified of the time expiration, and the presence information of self-presence information section 17a is changed from "Online" to "Away" or "Not Available". In the first setting method, however, counting starts when the first apparatus user stops performing action. In this regard, the first setting method is different from the second setting method whereby counting starts after the second apparatus, the server, or the first apparatus initiates an action in anticipation of some user reaction. In other words, the first setting method pertains only to whether or not the user is operating the apparatus (e.g., a PC), while the second setting method pertains to whether or not the user responds to some input made to the apparatus from a third party The fatter case concerns a problem within a communication apparatus.

18 is a key input section for keyboard inputting, 18a is a graphical user interface section (GUI section) as a function realization unit that controls display so that the user can input from the screen by using a pointing device (not shown); and 19 is a display that drives an LCD or the like. Key input section 18 accepts inputs through a numeric keypad for inputting the telephone number of the second apparatus user, function keys and the like, and sends the information to controller 16. GUI section 18a displays an active area that allows button input or the like by using the pointing device and the screen (display 19), allows a user to select a button or the like, and inputs corresponding data. GUI section 18a is an input unit that is achieved as software and provided in controller 16. Display 19 displays, on display 19 or speaker 14, display contents based on contents of a received signal the second apparatus, which is retrieved in accordance with a protocol and processed by data processor 13, or of an input signal (a signal input through key input section 18 and GUI section 18a) acquired by controller 16.

Controller 16 includes various function realization units. Memory 17 stores software for performing respective functions, i.e., control programs. A CPU (Central Processing Unit) executes the control programs associated with the respective functions by reading the programs into a main memory, thereby realizing these function units. The above-described GUI section 18a is one of these function realization units. Controller 16 includes action information acquisition unit 28 (described later) and action information detector 30. These units are not included in the technology illustrated in FIGS. 5 through 8.

20 is a communication unit as a function realization unit that performs communication using protocols such as SIP, RTP, TCP/UDP or IP; 21 is a presence user agent (PUA) section as a function realization unit that provides presence information to the presence system; 22 is a presence agent (PA) section as a function realization unit that is capable of generating a notification in accordance with a processing of a subscription request or a presence state change; and 23 is a watcher section as a function realization unit that acquires presence information as a client. Watcher section 23 has a function of requesting presence information by sending a "SUBSCRIBE" message and receiving the presence information by receiving a "NOTIFY" message.

PUA section 21, PA section 22 and watcher section 23 include units for performing the following specific functions. The functions of PUA section 21, PA section 22 and watcher section 23 are basically identical to those of PUA section 101, PA section 103 and watcher section 304 of the technology illustrated in FIGS. 5 through 8.

First, a description is provided for PUA section 21. PUA section 21 includes the following units. 24 is a presence rule setting unit that sets presence rules. Presence rule setting unit 24 sets, in presence rule registration section 17c, presence rules for each user, i.e., setting "5 minutes" for "Away" or "30 minutes" for "Not Available" in the second setting. The communication apparatus of the first embodiment selects "presence rule setting" from pull down menu A opened by clicking a "presence" button of FIG. 10, and makes settings by opening a setting screen. Presence rule setting unit 24 sets a predetermined period of time in presence rule registration section 17c. However, presence rule setting unit 106 and presence registration section 107 shown in FIG. 8 use different rules of determining trigger factors (event occurrence).

25 is a presence information setting unit that sets self-presence information; 26 is a display name setting unit that sets a display name for this setting; and 27 is a state setting unit that also sets presence information. Presence information basically includes the display name (name) and presence state of an apparatus.

Further, as presence information is controlled by ID, some users may not set their display names. In this case, display name setting unit 26 shown in FIG. 9 displays an ID as a display name. When an ID and a display name are both set, display name setting unit 26 displays the set display name as a display name. For instance, "123456" under "Not Available" shown in FIG. 10 indicates that the second apparatus user does not set his/her display name, and the ID of the second apparatus user is displayed as is.

Users can input states of the first apparatus, i.e., "Online", "Offline", "Away" and "Not Available". State setting unit 27 makes reference to presence rule registration section 17c based on the system state, determines that the state is "Online", "Offline", "Away" or "Not Available" according to the presence rules, and selects one state. Presence information setting unit 25 sets this state in self-presence information section 17a. Its detailed descriptions are described later with reference to FIG. 13.

Further, PA section 22 includes 22a, which is a presence information notification unit. Presence information notification unit 22a retrieves self-presence information from self-presence information section 17a and sends the self-presence information to second apparatus watcher section 23, when the second apparatus requests or sends the presence information.

Watcher section 23 is described in the following. 23a provided in watcher section 23 is a presence information request unit that requests presence information by sending a "SUBSCRIBE" message; and 23b is a presence information acquisition unit that acquires presence information by receiving a "NOTIFY" message. Presence information notification unit 22a sends self-presence information to the second apparatus; presence information acquisition unit 23b receives the self-presence information and updates data in not-self-presence information section 17b.

In FIG. 9, 28 is an action information acquisition unit. Action information acquisition unit 28 monitors an action from the second apparatus user, the server and an action performing unit (described later), and acquires opposing action information. When the display contents of a signal, which is processed by data processor 13, are output through display section 19 or speaker 14, and when the type and contents of the signal processed by data processor 13 or the type and contents of an input signal acquired by controller 16 are changed, action information acquisition unit 28 detects an action from the second apparatus user, the server and the action performing unit based on the detected type and contents of the signal. These configurations are not included in the technology illustrated in FIGS. 5 through 8.

29 is a display screen generator. Display screen generator 29 automatically generates a screen display of presence information and displays the presence information on the screen when displaying the presence information on the screen or opening presence menu B. Pull down menu A of "presence" shown in FIG. 10 has various link information including "presence rule setting" that sets presence rules in presence rule registration section 17c by opening a setting screen (window), "display name setting" that opens the setting screen (window) for setting a self display name in self-presence information section 17a and the like.

Pull down menu A further includes settings such as "log-in" that allows the user to log into the presence system and "log-out" that allows the user to log out from the presence system. At login, the user inputs his/her ID on a login screen. Pull down menu A further includes "rename setting" that renames the display name of the second apparatus user instead of displaying the display name of the second apparatus user as is, upon receiving a presence information notification from the second apparatus user. Here, this renaming process of the display name of the second apparatus user is performed and the renamed name is registered in not-self-presence information section 17b. "Manager" whose state is <Away> in FIG. 10 is displayed after renamed on the receiving end instead of displaying the display name of the second apparatus user as is.

30 is an action information detector; and 31 is a clock section that is capable of timer setting. Action information detector 30 detects the user's actions of operating the first apparatus and stores the actions into action information section 17d. Such actions include a VoIP response, an IM response, a file transfer, an input operation for canceling alarm or the like or ON/OFF operations (not shown). Action information detector 30 starts counting of clock section 31 upon detecting changes of display contents (including alarm sound) of display section 19 or possibly speaker 14 by such users' operations. When no user operation has been detected for a predetermined period of time after changes of the display contents, controller 16 determines that the user is absent, i.e., "Away" or "Not Available", and stops counting of clock section 31.

In FIG. 9, 32 is an action performing unit that performs based on settings predetermined operations for the user, including an alarm activation operation. Action performing unit 32 is activated according to settings; and action information acquisition unit 28 acquires action information indicating that a buzzer (not shown), speaker 14, an LED (not shown), an LCD display, a motor and the like are activated, and operates clock section 31. Operations of action performing unit 32 only need to automatically provide some functions to the user.

In the wireless communication apparatus described in the first embodiment, action information acquisition unit 28 starts a timer counting of clock section 31 upon detecting action information. After that, after clock section 31 counts up time set for "Away" and "Not Available", state setting unit 27 of the first apparatus is notified of the time expiration, and the presence information of self-presence information section 17a is changed from "Online" to "Away" or "Not Available".

Following the descriptions of wireless communication apparatuses 3a, 3b and 3c, a description is provided for the configuration of presence server 4 of the first embodiment of the present invention. FIG. 11 is a configuration diagram of the presence server according to the first embodiment of the present invention. In FIG. 11, 41 is a wired transmission/reception section that performs wired communication with IP network 1 such as the Internet or intranet. 42 is a wired communication controller that retrieves a requested message from IP packets received by wired transmission/reception section 41, in accordance with SIP protocols and the like, e.g., a "SUBSCRIBE" message, and sends the message to controller 44, which then performs necessary processes, such as checking of presence information and selection of a message, and then sends the requested message as an IP packet with a header attachment.

43 is a connector that connects IP network 1 to wired transmission/reception section 41; 44 is a controller that notifies or updates requested presence information by performing communication in accordance with a protocol; and 45 is a memory. Controller 44 includes various function realization units. Memory 45 stores software for executing respective functions, i.e., control programs. A CPU (Central Processing Unit) executes the control programs associated with the respective functions by reading the program into a main memory, thereby realizing these function units. Memory 45 is provided with a presence information registration section (not shown) that registers presence information of wireless communication apparatuses 3a, 3b or 3c. Presence server 4 replies to a presence information request from wireless communication apparatuses 3a, 3b or 3c, and when there is a change in the presence state, updates the presence information with the changed presence state. Presence server 4 is unnecessary for peer-to-peer communication; and the updated presence information is registered in not-self presence information section 17b shown in FIG. 9.

The following describes the configurations of access points 2a and 2b described in the first embodiment of the presence invention. FIG. 12 is a configuration diagram of the access point described in the first embodiment of the present invention. In FIG. 12, 51 is a wireless transmission/reception section that is wirelessly connected to wireless communication apparatuses 3a and 3b within the area; 52 is a wireless communication controller that retrieves an IP packet based on SIP protocols and the like from IP packets received by wireless transmission/reception section 51, and sends, through wireless transmission/reception section 51, the retrieved IP packet as an IP packet with a header attachment.

53 is a wired transmission/reception section that performs wired communication with IP network 1 such as the Internet or internet; 54 is a wired communication controller that retrieves an IP packet based on SIP protocols or the like from IP packets received from wired transmission/reception section 53, sends the IP packet to controller 44 for processing, and sends the retrieved IP packet as an IP packet with a header attachment. 55 is a connector that connects IP network 1 to wired transmission/reception section 53; 56 is a controller that performs system control; and 57 is a memory. An Ethernet cable or the like is connected to connector 55. Memory 57 stores software for performing respective functions, i.e., a control programs. A CPU (Central Processing Unit) executes the control programs associated with the respective functions by reading the program into a main memory, thereby realizing these function units.

As described above, wireless communication apparatuses 3a, 3b and 3c, presence server 4, and access points 2a and 2b include respective components and all points are connected to IP network 1. Therefore, a presence information notification is sent among wireless communication apparatuses 3a, 3b and 3c; self-presence information is retrieved from self-presence information section 17a and sent to watcher section 23 of the second apparatus. Presence information acquisition unit 23b of the second apparatus receives the self-presence information and updates data in not-self-presence information section 17b. Through such communication, presence information can be provided as described in FIGS. 5 through 7.

Descriptions have been provided for the configuration of the communication system according to the first embodiment. In the following, a detailed description is provided for the system operations based on: the function block diagram in FIG. 13; the configuration example of a packet in FIGS. 14(a) and 14(b); the flowchart in FIG. 17; the state change of the communication system described in the first embodiment in FIG. 18; and sequences illustrated in FIGS. 15 and 16. In FIG. 13, the user can input presence rules by opening "presence rule setting" from pull down menu A of FIG. 10. Accordingly, the presence rules are set in presence rule registration section 17c.

The user can input his/her display name by opening "display name setting" from pull down menu A. The display name is saved in self-presence information section 17a. The user also inputs "Online", "Offline", "Away" or "Not Available" by operating the wireless communication apparatus.

State setting unit 27 makes reference to the rules set in presence rule registration section 17c and compares with the current system state, and automatically determines a presence state. Presence information setting unit 25 stores the presence information along with the display name in self-presence information section 17a.

When a "SUBSCRIBE" message requesting presence information is received, or an event occurs for providing the presence information, presence information notification unit 22a makes reference to self-presence information section 17a and sends a notification to the watcher section of the second apparatus as shown in FIGS. 5(a) and 5(b). FIG. 14(b) shows a packet format of a "NOTIFY" message for wireless communication apparatus 3c of FIG. 1 to notify wireless communication apparatus 3a of the presence information. FIG. 14(a) shows SIP header and SIP body (body). In FIG. 14(b), this whole message is encapsulated as a payload for transmission. Although a presence information notification is described in accordance with PIDF (presence information data format) in SIP, a notification is described in XML as shown in the SIP body (body) of FIG. 14(a). ID "121212" and display name "Taro" are set as shown in FIG. 14(a).

The following describes a communication sequence of presence information processed in the communication system illustrated in FIG. 1 of the first embodiment, based on the sequences of FIGS. 15 and 16. FIG. 15 illustrates a sequence of peer-to-peer communication, based on the descriptions of the technology illustrated in FIG. 7 with reference to FIG. 1. When presence information is transmitted among wireless communication apparatuses 3a, 3b and 3c, telephone directory lists (contact lists) of wireless communication apparatus 3b and 3c are registered in wireless communication apparatus 3a (sq 1). When a predetermined event occurs, wireless communication apparatus 3a notifies wireless communication apparatus 3b of its presence information by sending a "NOTIFY" message indicating in this case that the user is present, i.e., "Online" (sq 2). In response, wireless communication apparatus 3b sends a "200 OK" message to wireless communication apparatus 3a (sq 3).

As with the case for wireless communication apparatus 3b, wireless communication apparatus Sa notifies wireless communication apparatus 3c of the presence information of wireless communication apparatus 3c, which indicates in this case that the user is present, i.e., "Online" (sq 4). In response, wireless communication apparatus 3c sends a "200 OK" to wireless communication apparatus 3a (sq 5).

Since the user is "Online", when wireless communication apparatus 3b initiates a call (calling) to wireless communication apparatus 3a by sending an "INVITE" message (sq 6), wireless communication apparatus 3a sends, to wireless communication apparatus 3b, a reply message "100 Trying" (sq 7), and a "180 Ringing" message indicating that the call is being made (sq 8), and calls up the user of wireless communication apparatus 3a by a ring tone or the like.

However, when the user of wireless communication apparatus 3a performs no operation after predetermined time A has passed since the "INVITE" message was sent, wireless communication apparatus 3a changes the presence state from "Online" to "Away" or "Not Available", indicating the user is absent (sq 9). The presence state is changed (updated) to "Away" when predetermined time A is set at a short period of time, e.g., 5 minutes, and to "Not Available" when predetermined time A is set at a longer period of time, e.g., 30 minutes.

Wireless communication apparatus 3a sends, to wireless communication apparatus 3b, a "NOTIFY" message notifying that its presence state is "Away" or "Not Available" (sq 10). In response, wireless communication apparatus 3b sends a "200 OK" message to wireless communication apparatus 3a (sq 11). Similarly, wireless communication apparatus 3a notifies wireless communication apparatus 3c of its presence state, i.e., "Away" or "Not Available" (sq 12); and wireless communication apparatus 3c sends a "200 OK" message to wireless communication apparatus Sa (sq 13). Accordingly, the presence information is changed on all of wireless communication apparatuses 3a, 3b and 3c.

In this state, when there is no presence state change of wireless communication apparatus 3a, wireless communication apparatus 3a notifies wireless communication apparatus 3b of its presence state, i.e., "Away" or "Not Available", at intervals of predetermined time B (sq 14); and wireless communication apparatus 3b sends a "200 OK" message to wireless communication apparatus 3a (sq 15). Similarly, wireless communication apparatus 3a also notifies wireless communication apparatus 3c of its presence state, i.e., "Away" or "Not Available" by sending a "NOTIFY" message (sq 16); and wireless communication apparatus 3b sends a "200 OK" message to wireless communication apparatus 3a (sq 17). This process is repeated at intervals of predetermined time B thereafter.

Next, a description is provided for a sequence for wireless communication apparatuses 3a and 3c to transmit presence information via presence server 4 with reference to FIG. 16. FIG. 16 illustrates a sequence via the presence server according to the first embodiment of the present invention, based on the descriptions of the core technology of FIG. 6. When presence information is transmitted between wireless communication apparatuses Sa and 3c via presence server 4, wireless communication apparatus 3c sends, to presence server 4, a "SUBSCRIBE" message requesting subscription to the presence information of wireless communication apparatus 3a (sq 21), In response, presence server 4 sends a "200 OK" message to wireless communication apparatus 3c (sq 22).

Further, presence server 4 sends, to wireless communication apparatus 3c, a "NOTIFY" message notifying the presence information of wireless communication apparatus 3a, which indicates in this case that the user is present, i.e., "Online" (sq 23). In response, wireless communication apparatus 3c sends a "200 OK" message to presence server 4 (sq 24).

Since the user is "Online", in this presence state, wireless communication apparatus 3c initiates a call (calling) to wireless communication apparatus 3a by sending an "INVITE" message (sq 25). In response, wireless communication apparatus 3a sends a reply message "100 Trying" (sq 26), and a "180 Ringing" message indicating that the call is being made (sq 27), and further calls up the user of wireless communication apparatus 3a by a ring tone or the like.

However, when the user of wireless communication apparatus 3a makes no operation after predetermined time A has passed since the "INVITE" message was sent, wireless communication apparatus 3a changes its presence state from "Online" to "Away" or "Not Available", which indicates that the user is absent (sq 28). The presence state is changed (updated) to "Away" when predetermined time A is set at a short period of time, e.g., 5 minutes, and to "Not Available" when predetermined time A is set at a longer period of time, e.g., 30 minutes.

Wireless communication apparatus 3a then sends, to presence server 4, a "PUBLISH" message requesting registration of "Away" or "Not Available" (sq 29). In response, presence server 4 sends a "200 OK" message to wireless communication apparatus 3a (sq 30); and registers the presence information in the presence information registration section. Presence server 4 then notifies wireless communication apparatus 3c that the user of wireless communication apparatus 3a is absent, i.e., "Away" or "Not Available" (sq 31); and wireless communication apparatus 3c sends a "200 OK" message to presence server 4 (sq 32), and the process is repeated thereafter.

The following describes a presence information determination method of the first embodiment with reference to the flowchart in FIG. 17. In this presence information determination method, the presence information is changed to "Away" or "Not Available" when the first apparatus user, while logged into the presence system, makes no reaction within a predetermined period of time after acquiring action information of the second apparatus user. The flowchart shows the internal operations of wireless communication apparatuses 3a, 3b and 3c when the presence information is changed as described in FIGS. 15 and 16.

As shown in FIG. 17, it is monitored whether or not any opposing action (user of the second apparatus, the presence server, or action performing unit 32 of the first apparatus) has been detected (step 1). Upon detecting any opposing action, clock section 31 sets the timer for predetermined periods of time for "Away" and "Not Available" (step 2), and starts counting.

Next, it is checked whether or not action information detector 30 has detected any reaction (step 3). When any reaction of the first apparatus user has not been detected at step 3, it is determined whether the timer has expired (step 4). When any reaction has been detected at step 3, it can be determined that the user is around. Therefore, the timer is cancelled (step 5), and the determination process ends while maintaining the presence state "Online".

When the timer has expired at step 4, it indicates that a state in which no reaction has been detected has continued for a predetermined period of time. Therefore, the presence state is changed to "Away" or "Available" according to the periods of time set for both (step 6).

FIG. 18 illustrates a state change of the communication apparatus described above. There are three types of standby, i.e., a present standby ("Online"), a time waiting standby, and an absent standby ("Away" or "Not Available"). When a screen display (the output of the display content of the apparatus) is shown in response to a call reception or an event occurrence during present standby, the state is changed to the time waiting standby. When there is any user operation, the state is returned to the present standby. When there is no user operation during time waiting standby, the state is changed to the absent standby by saving the absent information, i.e., "Away" or "Not Available". When there is any operation during absent standby, "Online" is saved in the memory, after which the state is returned to the present standby state.

As described above, according to the communication apparatus and the presence information determination method described in the first embodiment, it is determined that the user is "Away" or "Not Available" by detecting whether any action is made, in a predetermined time period, in response to a non-self action (action of the second apparatus user, the server, or the first apparatus), unlike a conventional determination method based on user action. State determination is thus made after contact is lost with the second apparatus user. In this method, "Away" or "Not Available" does not appear frequently. Moreover, it is possible to avoid situations where communication is terminated or postponed, although both users are near their apparatuses and actually ready to communicate. Although a wireless communication is used in the first embodiment, a wired communication apparatus can produce the same effects.

Further, according to the communication apparatus described in the first embodiment, individual communication apparatuses can freely change setting rules (respective setting times and other conditions, mode selection when both first and second setting methods are provided) for "Away" and "Not Available". Accordingly, accurate determination of presence information, i.e., whether "Away" or "Not Available", can be made.

Second Embodiment

Figure 19:
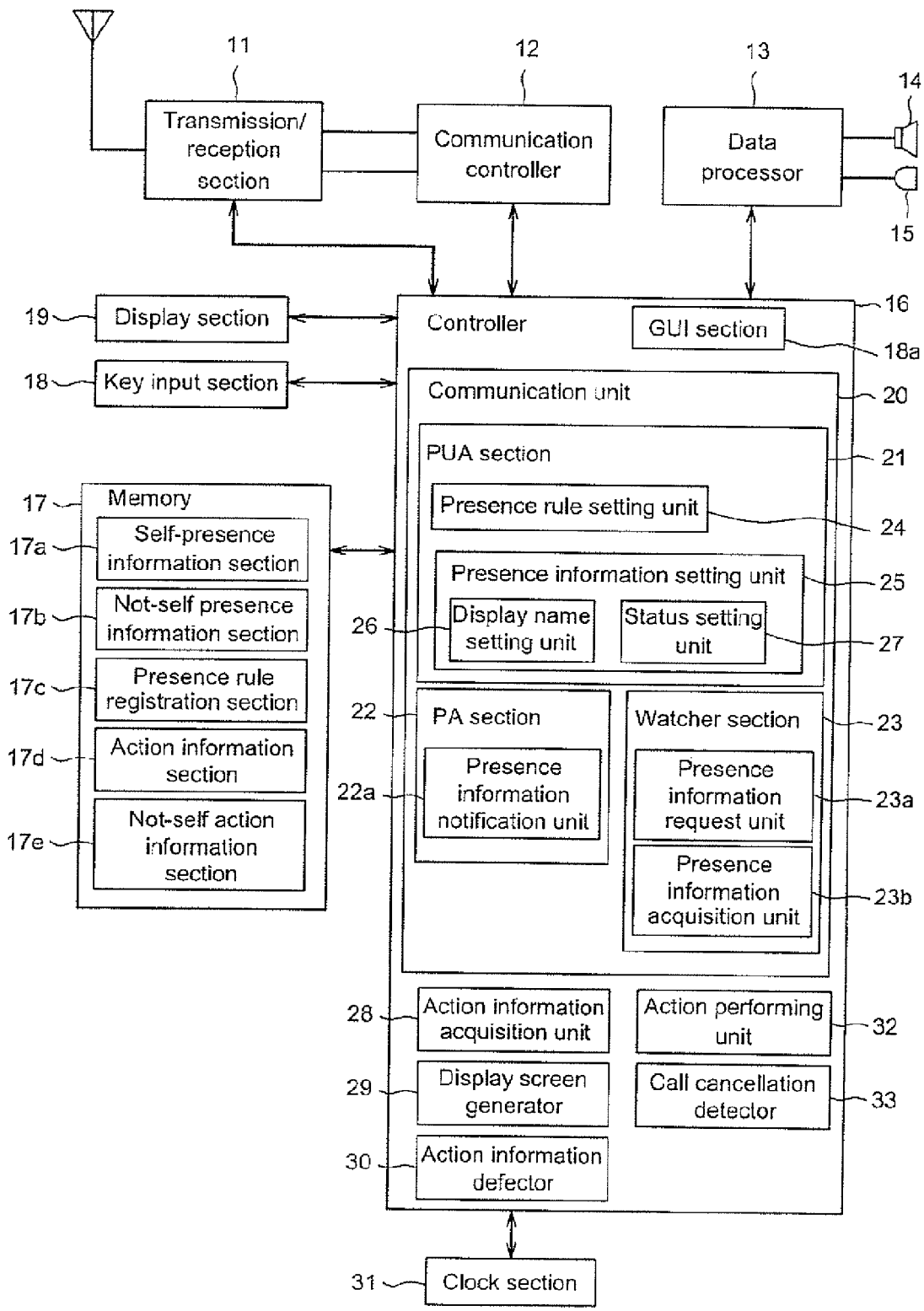
FIG. 19 is a configuration diagram of a wireless communication apparatus according to a second embodiment of the present invention.
Figure 20A:
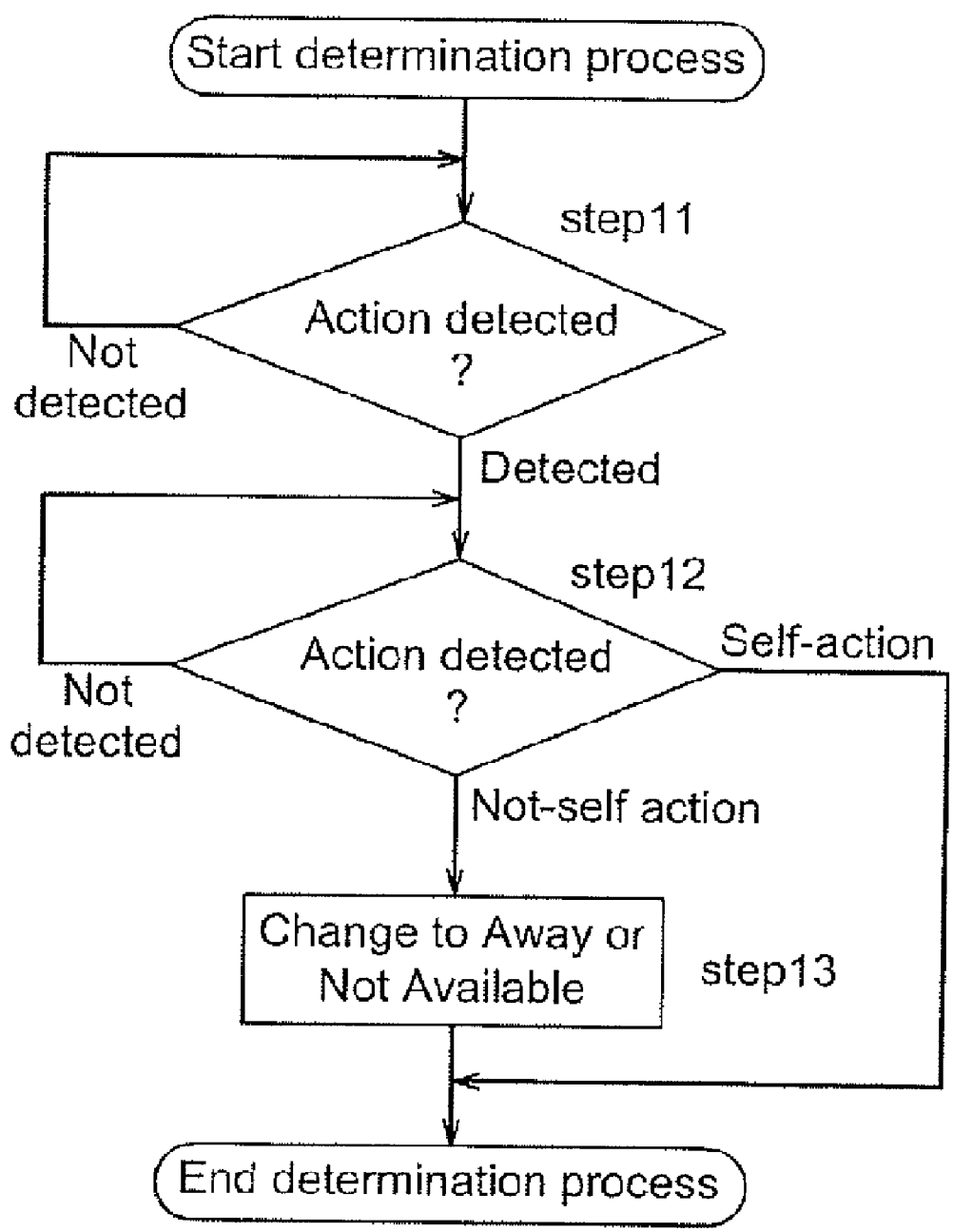
FIG. 20 (a) is a flowchart for determining presence information according to the second embodiment of the present invention.
Figure 20B:
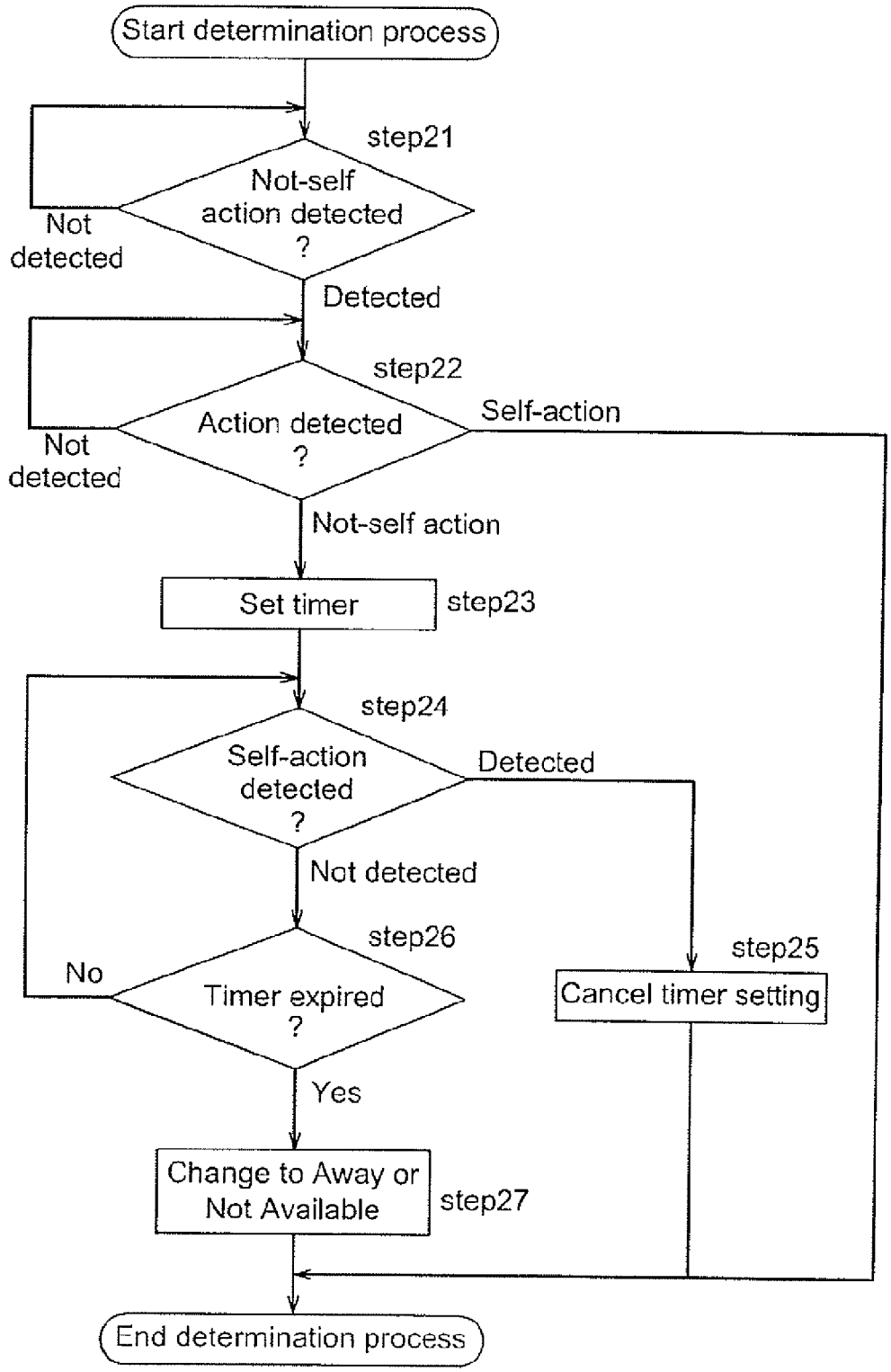
Figure 21:
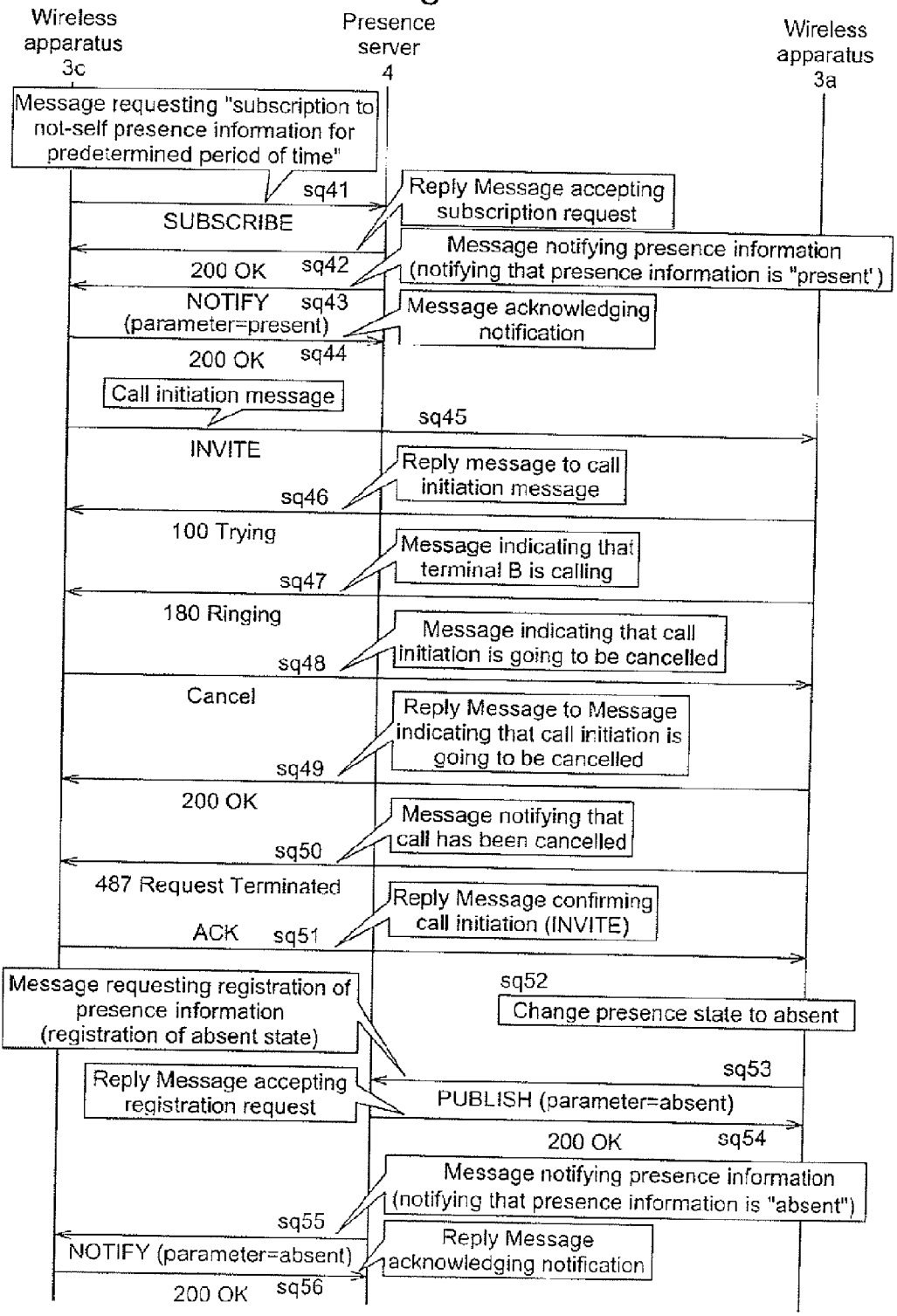
FIG. 21 illustrates a sequence in which a second apparatus user according to the second embodiment of the present invention cancels a call after initiating the call.

A description is provided for a communication apparatus and a presence information determination method according to the second embodiment of the present invention. According to the communication method and the presence information determination method of the second embodiment, presence information is changed to "Away" or "Not Available" depending on whether any second action is made in response to a predetermined action from a second apparatus user to a first apparatus user, while logged into a presence system. FIG. 19 is a configuration diagram of the wireless communication apparatus according to the second embodiment of the present invention; FIG. 20(a) is a flowchart determining presence information according to the second embodiment of the present invention; FIG. 20(b) is a flowchart determining presence information by using a timer according the second embodiment of the present invention; and FIG. 21 illustrates a sequence in which the second apparatus user according to the second embodiment of the present invention cancels a call after making the call. The communication apparatuses according to the second embodiment and first embodiment have basically the same configurations. Therefore, in FIG. 19, the same numbers represent the same configurations of FIG. 9, and their descriptions are thus omitted.

In FIG. 19, 33 is a call cancellation detector as a second action detector of the first apparatus that detects a second action related to, for example, a VoIP reception or the like, namely, a first apparatus user's operation or a call cancellation of the second apparatus user.

When an opposing action made to the first apparatus is a VoIP reception, and call cancellation detector 33 detects that the second apparatus user has cancelled the call, it indicates that the first apparatus user makes no response to a long-time calling. In other words, the user is not around the apparatus. In this case, it is proper to determinate that the user is "Away" or "Not Available". When the opposing action is a file transfer request reception, a file transfer request cancellation detector becomes necessary for detecting that the second apparatus user canceling a file transfer request. Upon detecting the file transfer request cancellation, it is also proper to determinate that the user is "Away" or "Not Available". As described above, a second action detector can take various forms. In this example, call cancellation detector 33 is used as an example. It has been described that, when a call cancellation is detected, it is proper to determine that the user is "Away" or "Not Available". However, it is also proper to determine that the user is "Away" or "Not Available" after a predetermined time has passed since the call cancellation was detected.

Second actions also include an action that the first apparatus itself automatically performs (hereinafter, it refers to other actions and auto reply according to the presence invention) when the first apparatus user performs no action. Examples include automatic forwarding to another telephone, which is performed after a calling time has passed, and an answering memo recording. In this case, it is determined that the user is absent and cannot operate the apparatus. These actions are detected by an automatic forwarding detector and an answering machine start-up detector respectively. Although not shown, these detectors can be provided in substitution for call cancellation detector 33, or can be configured to coexist with call cancellation detector 33.

Besides such a call cancellation by the second apparatus user, detected actions further include an action from the first apparatus user (hereinafter referred to as a "self-action"). When an opposing action is a VoIP reception, or a file transfer request reception, a second action detected by a second action detector other than call cancellation detector 33 includes a VoIP response, a file transfer initiation, and a file transfer request refusal. These actions are respectively detected by a VoIP response detector, a file transfer initiation detector and a file transfer request refusal detector, and a self action in response to an opposing action is detected. Although not shown, these detectors can be configured to coexist with call cancellation detector 33. When a self action is made, it is determined that the user has operated the apparatus, and the presence information is thus not changed to "Away" or "Available", Upon detecting a call cancellation without detecting these actions, the presence state is changed to "Away" or "Not Available".

The communication apparatus according to the second embodiment includes action information acquisition unit 28 that acquires opposing action information and a second action detector that detects a second action. Upon the detection, state setting unit 27 of the first apparatus is notified of the detected action. Here, when a self action is made, it is determined that the user has operated the apparatus, and the presence state is thus not changed to "Away" or "Not Available". When other actions are made, the presence information stored in self-presence information section 17a is changed from "Online" to "Away" or "Not Available". In the second embodiment, when opposing action is detected, the action information is saved in opposing action information section 17e.

It is also possible to set a timer at clock section 31 after a second action detector detects other actions, When a self action is detected, the process ends without further action. When other actions are detected, the timer starts counting. When the timer has reached the time set for "Away" or "Not Available", state setting unit 27 of the first apparatus is notified of the time expiration, and the presence information stored in self-presence information section 17a is changed from "Online" to "Away" or "Not Available". When a self action is detected among second actions before the timer expires, the process ends after the timer is cancelled without changing the presence information.

Next, a description is provided for the presence information determination method described in the second embodiment with reference to the flowcharts in FIGS. 20(a) and 20(b). Descriptions are first provided for a case where presence information is determined based solely on action with reference to FIG. 20(a). In FIG. 20(a), it is checked whether any opposing action such as a VoIP reception or a file transfer request reception has been detected (step 11).

When any opposing action, such as a VoIP reception, has been detected at step 11, it is checked whether any second action related to the opposing action has been detected (step 12). For instance, it is checked whether a VoIP response or a second apparatus call cancellation has been detected. At step 12, monitoring continues until any second action has been detected When any self-action among second actions, e.g., a VoIP response, has been detected, the previous presence state remains, and the determination process ends without changing the "Online" state. At step 12, when other action as a second action, e.g., a second apparatus call cancellation, has been detected, the presence information is immediately changed to "Away" or "Not Available" (step 13).

Next, a description is provided with reference to FIG. 20(b) for a case where presence information is determined by using the timer. In FIG. 20(b), it is checked whether any opposing action such as a VoIP reception or a file transfer request reception has beer detected (step 21).

At step 21, when any opposing action, e.g., a VoIP reception, has been detected, it is checked whether any second action related to the opposing action (e.g., VoIP response), has been detected at step 22. At step 22, monitoring continues until any second action has been detected. When any self action as a second action, e.g., a VoIP response, has been detected, the previous presence state remains, and the determination process ends without changing the "Online" state. At step 22, when other action other than a self-action as a second action has been detected, the time set for "Away" and "Not Available" is set by the timer (step 23). When any self action as a second action has been detected, the process ends without any further action.

While the timer is counting at step 23, it is monitored whether any self action, e.g., an operation for making reference to an absent call reception history, has been detected (step 24). When any self action is detected while the timer is counting, the timer is cancelled (step 25), and the process ends.

When any self action, e.g., an operation for making reference to an absent call reception history, has not be detected, it is determined whether the timer has expired (step 26). When the timer has not expired, the process returns to step 24. When the timer has expired, the presence information of self-presence information section 17a is changed from "Online" to "Away" or "Not Available" (step 27), and the process ends.

Next, a description is provided for a sequence in which the second apparatus user cancels a call after initiating the call while wireless communication apparatuses 3a and 3c are transmitting presence information via presence server 4. In presence information transmission between wireless communication apparatuses 3a and 3c via presence server 4, wireless communication apparatus So sends, to presence server 4, a "SUBSCRIBE" message requesting subscription to the presence information of wireless communication apparatus 3a (sq 41). In response, presence server 4 sends a "200 OK" message to wireless communication apparatus 3c (sq 42).

Further, presence server 4 notifies wireless communication apparatus 3c of the presence information of wireless communication apparatus 3a, which in this case indicates that the user is present, i.e., "Online" by sending a "NOTIFY" message (sq 43). In response, wireless communication apparatus 3c sends a "200 OK" message to presence server 4 (sq 44).

Since the user is "Online", in this presence state, wireless communication apparatus 3c initiates a call (calling) to wireless communication apparatus 3a by sending an "INVITE" message (sq 45). In response, wireless communication apparatus 3a sends a reply message "100 Trying" (sq 46), and a "180 Ringing" message indicating that the call is being made (sq 47), and further calls up the user of wireless communication apparatus 3a by a ring tone or the like.

However, when the user of wireless communication apparatus 3a performs no operation after a predetermined time has passed since the "INVITE" message was sent, the user of wireless communication apparatus 3c sends a "CANCEL" message indicating that the user of wireless communication apparatus 3c cancels the call (sq 48), In response, wireless communication apparatus 3a sends a reply message "200 OK" in response to the "CANCEL" message (sq 49), and a notification message "487 Request Terminated" indicating that the call has been cancelled (sq 50). In response, wireless communication apparatus 3c sends an "ACK" message acknowledging the "INVITE" message.

Wireless communication apparatus 3a then changes the presence state from "Online" to "Away" or "Not Available" indicating that the user is absent (sq 52). Further, wireless communication apparatus 3a sends, to presence server 4, a "PUBLISH" message notifying that the user is "Away" or "Not Available" (sq 53). In response, presence server 4 sends a "200 OK" message to wireless communication apparatus 3a (sq 54). Presence server 4 then notifies wireless communication apparatus 3c of the presence information indicating that the user of wireless communication apparatus 3a is absent, i.e., "Away" or "Not Available" (sq 55). Wireless communication apparatus 3c then sends a "200 OK" message to presence server 4 (sq 56), and a series of operations end.

As described above, according to the communication apparatus and the presence information determination method described in the second embodiment, it is determined that the user is "Away" or "Not Available" by detecting whether any second action is made in response to a non-self action, unlike a conventional determination method based on user action. This enables a simple and reliable determination while avoiding situations where "Away" or "Not Available" frequently appears. Further, determination ranges for "Away" and "Not Available" can be expanded.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No 2005-275743 filed on Sep. 22, 2005 and the Japanese Patent Application No. 2006-247728 filed on Sep. 13, 2006, entire content of which are expressly incorporated by reference herein.

What is claimed is:

1. A communication apparatus comprising:
a communicator configured to communicate with a first terminal apparatus and with a second terminal apparatus, said communicator receiving a signal from the first terminal apparatus;
an operating section configured to be operated by a user of said communication apparatus;
an operation detector configured to detect operation of said operating section by the user in response to the signal; and
a controller configured to transmit, to the second terminal apparatus, presence information indicating that said operation detector does not detect the operation of said operating section within a predetermined time period after said communicator receives the signal from the first terminal apparatus,
wherein the predetermined time period comprises first and second different predetermined time periods, said controller being configured to transmit, to the second terminal apparatus, first presence information indicating that said operation detector has detected the operation of said operating section within the first predetermined time period after said communicator receives the signal from said first terminal apparatus, said controller being further configured to transmit, to the second terminal apparatus, second presence information indicating that said operation detector has not detected the operation of said operating section within the first predetermined time period and, to transmit to the second terminal apparatus, third presence information indicating that said operation detector has not detected the operation of said operating section within the second predetermined time period.

2. The communication apparatus according and 1, wherein the presence information indicates that a current status of the user is present when said operation detector detects the operation of said operating section within the predetermined time period after said communicator receives the signal, and the presence information indicates that the current status of the user is not present when said operation detector does not detect the operation of said operating section for a predetermined time period after said communicator receiver the signal.

3. The communication apparatus according to claim 1, further comprising:
a memory configured to store the presence information;
wherein said controller changes the presence information in said memory such that the presence information indicates that the current status of the user is not present when said operation detector does not detect the operation, by the user, for a predetermined time period after said communicator receives the signal.

4. The communication apparatus according to claim 3, wherein said controller changes the presence information in said memory such that the presence information indicates that the current status of the user is present when said operation detector detects the operation of said operating section within the predetermined time period after said communicator receives the signal.

5. The communication apparatus according to claim 1, said operating section being configured to set the first and second predetermined time periods.

6. The communication apparatus according to claim 1, further comprising a display configured to indicate presence information of the communication apparatus and status information of at least one terminal apparatus.

7. The communication apparatus according to claim 1, said controller being further configured to change the presence information from indicating present to indicating not present in response to a status changing input by the user at the operating section.

8. The communication apparatus according to claim 1, said controller being configured to selectively operate in accordance with one of a first mode and a second mode, wherein the first mode changes the presence information when the user is logged on and has performed no action during the predetermined time period and wherein the second mode changes the presence information when the user is logged on and has performed no action during a predetermined time period starting after an action is performed, externally of the communication apparatus, in anticipation of a responsive action by the user of the communication apparatus.

9. The communication apparatus according to claim 8, wherein the action performed externally of the communication apparatus comprises at least one of a VoIP reception, and IM reception, a file transfer request and an alarm operation.

10. The communication apparatus according to claim 1, wherein, when the operation detector does not detect the operation of the operating section within the predetermined time period, the controller transmits presence information to the second terminal apparatus at predetermined time intervals, indicating that the user is absent.

* * * * *

UNITED STATES PATENT AND TRADEMARK OFFICE
CERTIFICATE OF CORRECTION

PATENT NO. : 7,983,403 B2
APPLICATION NO. : 11/533856
DATED : July 19, 2011
INVENTOR(S) : Sakata et al.

Page 1 of 1

It is certified that error appears in the above-identified patent and that said Letters Patent is hereby corrected as shown below:

At column 22, line 52 (claim 2, line 1) of the printed patent, "according and 1" should read --according to claim 1--.

Signed and Sealed this
Fourteenth Day of February, 2012

David J. Kappos
*Director of the United States Patent and Trademark Office*